United States Patent
Darolfi et al.

(10) Patent No.: US 11,872,841 B2
(45) Date of Patent: Jan. 16, 2024

(54) AUTOMATED REMOVAL AND REPLACEMENT OF VEHICLE WHEELS AND TIRES

(71) Applicant: RoboTire, Inc., Canton, MI (US)

(72) Inventors: Victor Darolfi, San Francisco, CA (US); Jonathan Downey, Canton, MI (US); Robert Baranowski, San Francisco, CA (US); Mark Bauer, San Francisco, CA (US); Bernard J. Michini, San Francisco, CA (US)

(73) Assignee: RoboTire, Inc., Canton, MI (US)

( * ) Notice: Subject to any disclaimer, the term of this patent is extended or adjusted under 35 U.S.C. 154(b) by 0 days.

(21) Appl. No.: 18/108,207

(22) Filed: Feb. 10, 2023

(65) Prior Publication Data

US 2023/0191832 A1 Jun. 22, 2023

Related U.S. Application Data

(60) Continuation of application No. 17/902,852, filed on Sep. 4, 2022, now Pat. No. 11,667,153, which is a
(Continued)

(51) Int. Cl.
*B60C 25/05* (2006.01)
*B25J 9/16* (2006.01)
(Continued)

(52) U.S. Cl.
CPC ............ *B60B 29/001* (2013.01); *B21D 39/00* (2013.01); *B23P 6/00* (2013.01); *B23P 19/04* (2013.01);
(Continued)

(58) Field of Classification Search
CPC .. B23P 6/00; B23P 19/04; B23P 19/06; B23P 19/069; B23P 21/002; B23P 2700/50;
(Continued)

(56) References Cited

U.S. PATENT DOCUMENTS

| 5,125,298 A | 6/1992 | Smith | |
| 5,724,743 A * | 3/1998 | Jackson | G01B 11/2755 33/203.18 |

(Continued)

FOREIGN PATENT DOCUMENTS

| CN | 104354548 B | 1/2017 |
| CN | 109454436 A | 3/2019 |

(Continued)

OTHER PUBLICATIONS

International Search Report & Written Opinion for Application No. PCT/US2019/028033, dated Jul. 31, 2019.

*Primary Examiner* — Jermie E Cozart
(74) *Attorney, Agent, or Firm* — Cognition IP, P.C.; Edward Steakley

(57) ABSTRACT

Systems, methods and apparatus for automated vehicle wheel removal and replacement are provided. One system includes a computer system with applications for scheduling the replacement of tires for the vehicle. An electronically controlled lift device and robotic apparatus is configured for interaction with the computer system. The lift device mechanically adjusts arms for placement on lift points of vehicles. The robotic apparatus detects positioning of lug nut configuration for a wheel, removes lug nuts, and then removes the wheel from the wheel hub with gripping arms. The wheel and tire are then handed off to a separate tire changing machine. When a new tire is replaced the robotic apparatus then mounts the wheel to the original wheel hub, and then secures the lug nuts to the lug nut bolts.

20 Claims, 23 Drawing Sheets

Related U.S. Application Data continuation of application No. 17/190,620, filed on Mar. 3, 2021, now Pat. No. 11,446,958, which is a division of application No. 16/386,512, filed on Apr. 17, 2019, now Pat. No. 10,974,546.

(60) Provisional application No. 62/660,798, filed on Apr. 20, 2018.

(51) Int. Cl.
| | |
|---|---|
| *B23P 19/04* | (2006.01) |
| *B23P 19/06* | (2006.01) |
| *B23P 6/00* | (2006.01) |
| *B60S 5/00* | (2006.01) |
| *B23P 21/00* | (2006.01) |
| *B60B 29/00* | (2006.01) |
| *B25J 11/00* | (2006.01) |
| *B21D 39/00* | (2006.01) |
| *B66F 7/26* | (2006.01) |

(52) U.S. Cl.
CPC ............ *B23P 19/06* (2013.01); *B25J 9/1656* (2013.01); *B25J 9/1679* (2013.01); *B25J 9/1697* (2013.01); *B25J 11/005* (2013.01); *B25J 11/008* (2013.01); *B60B 29/00* (2013.01); *B60C 25/0515* (2013.01); *B23P 19/069* (2013.01); *B23P 21/002* (2013.01); *B23P 2700/50* (2013.01); *B25J 9/1661* (2013.01); *B25J 9/1674* (2013.01); *B60B 2320/00* (2013.01); *B60B 2320/10* (2013.01); *B60B 2340/18* (2013.01); *B60B 2340/34* (2013.01); *B60B 2340/50* (2013.01); *B60B 2340/52* (2013.01); *B60S 5/00* (2013.01); *B66F 7/26* (2013.01)

(58) Field of Classification Search
CPC ....... B60C 25/0515; B60S 5/00; B21D 39/00; B60B 29/00; B60B 29/001; B60B 2340/50; B60B 2340/18; B60B 2320/00; B60B 2320/10; B25J 9/1656; B25J 9/1697; B25J 9/1679; B25J 9/1674; B25J 9/1661; B25J 11/008; B25J 11/005
See application file for complete search history.

(56) References Cited

U.S. PATENT DOCUMENTS

| | | | |
|---|---|---|---|
| 6,456,372 B1* | 9/2002 | Hudy | G01B 11/2755 356/139.09 |
| 6,600,555 B2* | 7/2003 | McClenahan | G01C 1/00 700/59 |
| 8,086,340 B2 | 12/2011 | Kondo et al. | |
| 8,457,925 B1* | 6/2013 | Stieff | G01B 21/26 702/152 |
| 8,776,345 B2 | 7/2014 | Komatsu et al. | |
| 9,248,701 B2 | 2/2016 | Calvi | |
| 9,333,654 B2* | 5/2016 | Chen | B25J 9/1697 |
| 9,610,660 B2 | 4/2017 | Komatsu et al. | |
| 9,700,973 B2 | 7/2017 | Komatsu et al. | |
| 9,700,974 B2 | 7/2017 | Komatsu et al. | |
| 9,757,827 B2 | 9/2017 | Komatsu et al. | |
| 9,757,828 B2 | 9/2017 | Komatsu et al. | |
| 10,493,799 B2 | 12/2019 | Hedley et al. | |
| 2004/0039544 A1* | 2/2004 | Merrill | G01B 11/275 702/147 |
| 2004/0139620 A1* | 7/2004 | Stopa | G01B 11/2755 33/203.18 |
| 2006/0126966 A1* | 6/2006 | Strege | B66F 7/28 382/289 |
| 2006/0279728 A1* | 12/2006 | Dorrance | G01B 11/2755 356/139.03 |
| 2006/0288577 A1 | 12/2006 | Bormuth | |
| 2008/0267441 A1 | 10/2008 | Bux et al. | |
| 2009/0035107 A1 | 2/2009 | Duran et al. | |
| 2009/0271041 A1 | 10/2009 | Knestel | |
| 2013/0276306 A1 | 10/2013 | Calvi | |
| 2016/0152102 A1 | 6/2016 | Campell | |
| 2018/0035606 A1 | 2/2018 | Burdoucci | |
| 2019/0304084 A1* | 10/2019 | Oblizajek | B60C 25/007 |
| 2019/0389258 A1 | 12/2019 | Wen | |
| 2020/0001414 A1 | 1/2020 | Wen | |

FOREIGN PATENT DOCUMENTS

| | | |
|---|---|---|
| EP | 1645439 A2 | 4/2006 |
| EP | 1645439 B1 | 8/2011 |
| JP | 01-145287 A | 6/1989 |
| JP | H06-219105 A | 8/1994 |
| KR | 20180044109 A | 5/2018 |
| WO | 2014/081573 A1 | 5/2014 |
| WO | 2019/204552 A1 | 10/2019 |
| WO | 2019/210390 A1 | 11/2019 |

* cited by examiner

| Vehicle Id | Make | Model | Year | Lug-Nut Pattern | Vehicle Lift Height | Vehicle Lift Points |
|---|---|---|---|---|---|---|
| 1234567 | Ford | Mustang | 2015 | 5-bolt | 20 inches | x-y coordinate data |
| 1234568 | Ford | Mustang | 2016 | 5-bolt | 21 inches | x-y coordinate data |
| 1234569 | Ford | Mustang | 2017 | 5-bolt | 21 inches | x-y coordinate data |
| 1234570 | Chevrolet | Cruze | 2014 | 4-bolt | 18 inches | x-y coordinate data |
| 1234571 | Chevrolet | Cruze | 2015 | 4-bolt | 18 inches | x-y coordinate data |
| 1234572 | Chevrolet | Cruze | 2016 | 4-bolt | 18 inches | x-y coordinate data |
| 1234573 | Jeep | Wrangler | 2015 | 5-bolt | 22 inches | x-y coordinate data |
| 1234574 | Jeep | Wrangler | 2016 | 5-bolt | 22 inches | x-y coordinate data |

FIG. 6

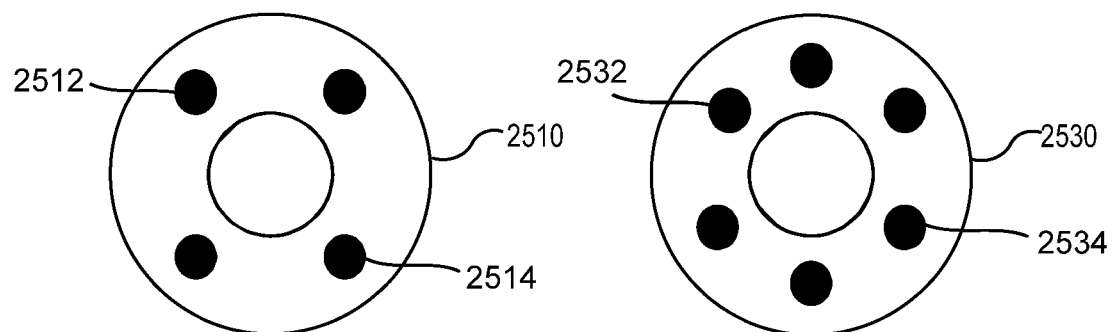
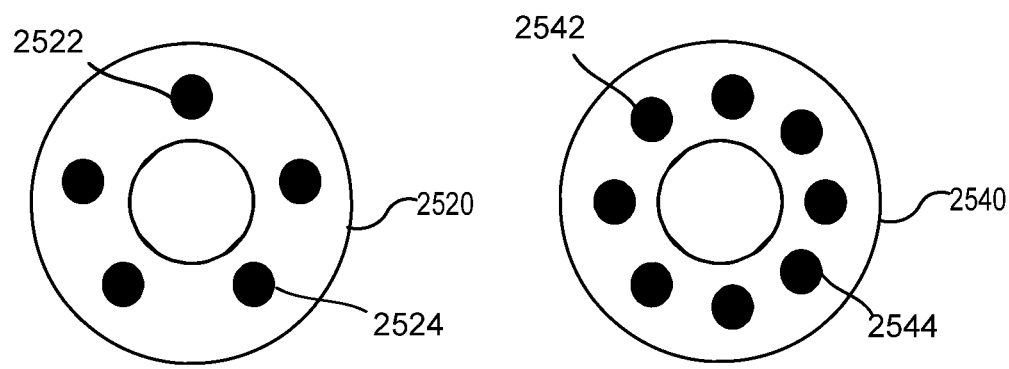
FIG. 25

AUTOMATED REMOVAL AND REPLACEMENT OF VEHICLE WHEELS AND TIRES

CROSS-REFERENCE TO RELATED APPLICATIONS

This application is a continuation of U.S. Non-Provisional application Ser. No. 17/902,852, filed on Sep. 4, 2022, which is a continuation of U.S. Non-Provisional application Ser. No. 17/190,620, filed on Mar. 3, 2021, which is a divisional of U.S. Non-Provisional application Ser. No. 16/386,512, filed on Apr. 17, 2019, issued as U.S. Pat. No. 10,974,546, which claims the benefit of U.S. Provisional Application No. 62/660,798, filed Apr. 20, 2018, which are hereby incorporated by reference in their entirety.

BACKGROUND

Removal of wheels from vehicle wheel hubs and placing old tires with new tires onto the removed wheels is a manual and time-intensive process. Often a vehicle is jacked up or lifted by a manually operated hydraulic lift or vehicle jack. Lug nuts are then manually removed via a torque wrench or tire iron. Once the lug nuts are removed, the wheel and tire are then physically handled and removed from a wheel-hub. Such manual operations may lead to inefficient operations, and potential physical hazards to a person removing the wheel and tire from the vehicle.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 6 illustrates an example table for a database of the computer system.

FIG. 25 illustrates a schematic illustration of different types of lug nut patterns.

DETAILED DESCRIPTION

Figure 1:
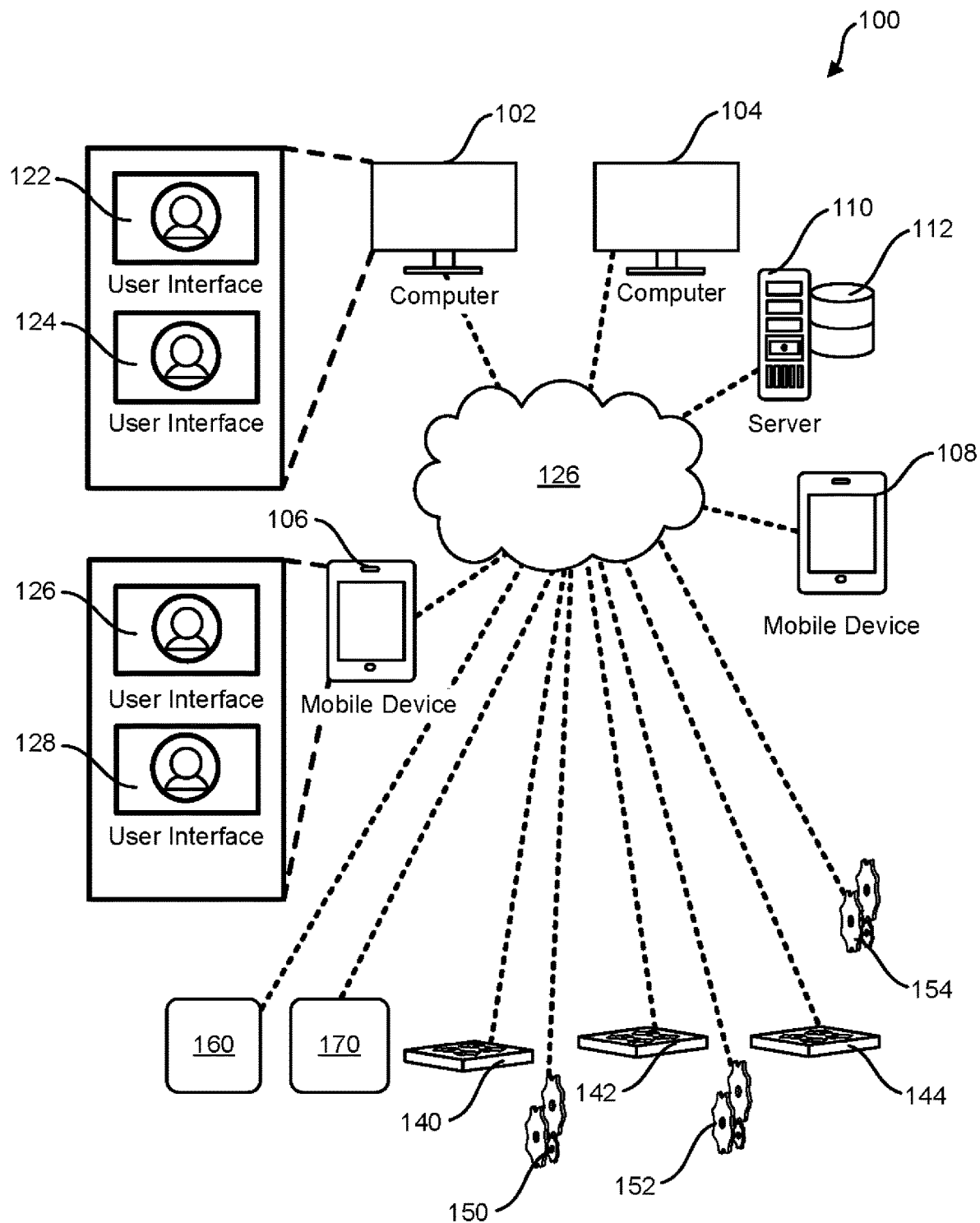
FIG. 1 illustrates an example system for the automated removal and replacement of a wheel and tire.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Among other features, this specification describes a system to automatically remove and dismount a wheel from a vehicle for tire replacement, and then replace the wheel once a tire has been mounted.

Embodiments of the disclosure include a system, method and computer readable media for controlling and/or scheduling control of a robotic apparatus from applications operable on two or more different remote devices. The system receives one or more control parameters from an application user interface displayed by the two or more remote devices. Each device receives information via user input from the user interface, and the parameter data is sent by the device, and is received by the system and stored in a data repository. The system then uses the stored parameter data to direct or control the operations of a robotic apparatus according to the parameter data received from each device. For example, the parameter data may be specific to a particular type of vehicle. The system determines the operation of the robotic apparatus based on the type of vehicle. The system instructs the robotic apparatus to perform different operations for different types of vehicles. Further, during operation of the robotic apparatus, the system may transmit to the device originating the control parameters, sensor data obtained by the robotic apparatus.

Embodiments of the disclosure include a system, method and computer readable media for performing automatic wheel removal and tire replacement. The system determines a wheel fastener pattern for a first wheel of a first vehicle. Based on the determined wheel fastener pattern, the system directs a robotic apparatus to remove three or more wheel fasteners from a first wheel hub of the first vehicle. The robotic apparatus removes the first wheel from the first wheel hub of the first vehicle. The wheel is handed off to a tire changing removal and replacement station. The robotic apparatus retrieves the first wheel and replaces the first wheel onto the first wheel hub of the first vehicle. Based on the determined wheel fastener pattern, the system directs the robotic apparatus to secure the three or more wheel fasteners onto the first wheel hub of the first vehicle.

Embodiments of the disclosure include a system, method and computer readable media for performing automatic wheel removal and tire rotation. The system determines a wheel fastener pattern for a first wheel of a first vehicle. Based on the determined wheel fastener pattern, the system directs a robotic apparatus to remove three or more wheel fasteners from a first wheel hub of the first vehicle. The robotic apparatus removes the first wheel from the first wheel hub of the first vehicle, and places the wheel in a staging location. One or more robotic apparatus removes the other wheels from the other vehicle's wheel hubs, and places the removed wheels in a staging location. The system determines a rotational pattern for placing the wheels back onto the vehicle's wheel hubs. Based on the determined rotational pattern, the one or more robotic apparatus place the wheels onto a different wheel hub than the original wheel hub from which they were removed.

In one embodiment, there is a system and computer-implemented method for vehicle wheel removal and replacement. The system determines a wheel fastener pattern for a first wheel of a first vehicle. Based on the determined wheel fastener pattern, the system removes using a robotic apparatus three or more wheel fasteners from a first wheel hub of the first vehicle. The system using a robotic apparatus, removes the first wheel from the first wheel hub of the first vehicle. The system using the robotic apparatus replaces the first wheel onto the first wheel hub of the first vehicle. The system using the robotic apparatus then applies the three or more wheel fasteners onto the first wheel hub of the first vehicle.

In a further embodiment, based on the determined wheel fastener pattern, the system using the robotic apparatus removes three or more wheel fasteners from a second wheel hub of the first vehicle. The system using the robotic apparatus, removes the second wheel from a second wheel hub of the first vehicle. The system using the robotic apparatus, replaces the second wheel onto the second wheel hub of the first vehicle. The system using the robotic apparatus then applies the three or more wheel fasteners onto the second wheel hub of the first vehicle.

As used herein, a lug nut is a fastener used to secure a wheel to a vehicle wheel hub via threaded wheel bolts. Typically, 4, 5, 6 or 8 lug nuts are used to secure the wheel to the wheel hub. Some wheel fastener designs use lug bolts which screw into a tapped (or threaded) hole in the wheel's hub, rotor, drum brake or disk. For purposes of this disclosure, application of a lug nut contemplates application to lug bolts also.

System

Referring to FIG. 1, an exemplary system 100 for the automated removal and replacement of a wheel and tire is disclosed. The system 100 can be a system of one or more computers 102, 104, 106, 108, 110 (generally referred to as 102) including software executing a method system on one or more computers 102, which is in communication with, or maintains one or more databases 112 of information. While the database 112 is depicted as coupled with one computer 110, the database may be distributed, replicated in whole or part, and communicatively coupled to other computers 102. For example, portions or subsets of data may be distributed to various computers 102 to allow for local database access of information stored on database 112. The information stored by the system 100 may include, but is not limited to, the following databases:

Customer Database, including fields such as cust_record_id, customer_name, customer_address, customer_phone_number.

Customer Vehicle Database, including fields such as cust_veh_record_id, vehicle_make, vehicle_model, vehicle_ identification_number, vehicle_license_plate, vehicle_year, vehicle_color, desired_tire_pressure, desired_gas_type, wheel_locks.

General Vehicle Database, including fields gen_veh_record_id, vehicle_make, vehicle_model, vehicle_year, lifting_point_coordinates, lifting_height, axle_distance, tpms_type, lugnut_configuration.

Inventory Database, including fields such as inv_record_id, tire_quantity, tire_size, tire_brand, manufacturer, speed_rating, pressure_setting, location_stored, location_coordinates.

Scheduling Database including fields such as sched_record_id, cust_record_id, cust_veh_record_id, schedule_appointment_date_and_time, front_tire_SKU_nurnbers, rear_tire_SKU_numbers.

The system 100 may include other tables, and database files, and may store images and other sensor data obtained by the system 100 as described herein.

The system 100 generates tire change jobs based on received customer information and customer vehicle information. The system 100 may use the received information as control parameters to direct the control or operation of a vehicle lifting device for lifting vehicles and robotic apparatus for lug nut and wheel removal and replacement as disclosed herein. The system 100 may receive and store images associated with a customer vehicle in a database 112. The system 100 uses image evaluation processes to perform object detection, and/or create 3-dimensional model of a wheel of a vehicle. The system 100 interacts and is communicatively coupled with one or more vehicle lifting devices 140, 142, 144 (generally referred to as 140), with one or more robotic apparatus 150, 152, 154 (generally referred to as 150) and one or more tire removal/replacement machines 160, and one or more tire balancing machines 170. The system 100 may include multiple interfaces 122, 124, 126, 128 (generally referred to as 122) based on the particular functionality to be performed by the system 100. For example, the system 100 may include a customer interface for receiving customer and vehicle information; an operator interface for control and operation of the vehicle lifting device 140, the robotic apparatus 150, the tire removal/replacement machines 160, and/or the tire balancing machines 170. Additionally, other interfaces may be utilized.

In one example, a user interface receives information to schedule the replacement of tires for a vehicle. This information is stored in a data repository of the system. The architecture of the system allows for interaction with multiple remote devices, such as tablet, cellular phone, laptop, other mobile internet connected devices, and the like. A software application, program, web page or other processes may be executed on the remote devices. The system 100 retrieves and stores the information which is obtained from multiple users with respect to scheduling a tire change job. Each of the users are providing control parameters for the operation of the robotic apparatus 150 that will be later used to perform the automated lifting, and wheel removal and replacement onto their vehicle.

The system 100 may use a computer network 126 for communication to one or more computers 102 of the system 100. As described herein, the computer network 120, may include, for example, a local area network (LAN), a virtual LAN (VLAN), a wireless local area network (WLAN), a virtual private network (VPN), cellular network, wireless network, the Internet, or the like, or a combination thereof.

Vehicle lifting devices 140 may be communicatively coupled to the system 100 via computer network 120. The vehicle lifting devices 140 may receive instructions, commands and other data from the system 100. The vehicle lifting device 140 is further described herein. The vehicle lifting device 140 may include different types of sensors to obtain sensor data describing a vehicle. The sensor data obtained by the vehicle lifting device 140 may be transmitted to the system 100 for analysis and/or storage into a database 112. The vehicle lifting device 140 provides a mechanism to physically lift a vehicle in a vertical manner according to a predetermined height value.

Robotic apparatus 150 may be communicatively coupled to the system 100 via computer network 120. The robotic apparatus 150 may receive instructions, commands and other data from the system 100. The robotic apparatus 150 is further described herein. The robotic apparatus 150 may include different types of sensors integrated into the robotic apparatus 150 to obtain sensor data describing the vehicle. The sensor data obtained by the robotic apparatus 150 may be transmitted to the system 100 for analysis and/or storage into a database 112. The robotic apparatus 150 provides a mechanism to physically remove a wheel from a vehicle and physically replace the wheel back onto the vehicle. As further described, the robotic apparatus 150 may have different configurations of tooling ends that allow for the removal and replacement of wheel fasteners and the removal and replacement of the wheel from a vehicle wheel hub.

One or more tire removal machines 160 may be communicatively coupled to the system 100 via computer network 120. The tire removal machine 160 may receive instructions, commands and other data from the system 100. The tire removal machine 160 may include different types of sensors integrated into the tire removal machine 160 to obtain sensor data describing a wheel and/or tire. The sensor data obtained by the tire removal machine 160 may be transmitted to the system 100 for analysis and/or storage into a database 112. The tire removal machine 160 may receive one or more parameters, such as wheel size, tire size, tire pressure monitoring system (TPMS) location, desired tire inflation PSI value and/or a value for a type of gas such as air, or nitrogen to be used for tire inflation.

One or more tire balancing machines 170 may be communicatively coupled to the system 100 via computer network 120. The tire balancing machine 170 may receive instructions, commands and other data from the system 100. The tire balancing machine 170 may include different types of sensors integrated into the tire balancing machine 170 to obtain sensor data describing a wheel and/or tire. The sensor data obtained by the tire removal machine 170 may be transmitted to the system 100 for analysis and/or storage into a database 112.

Figure 2A:
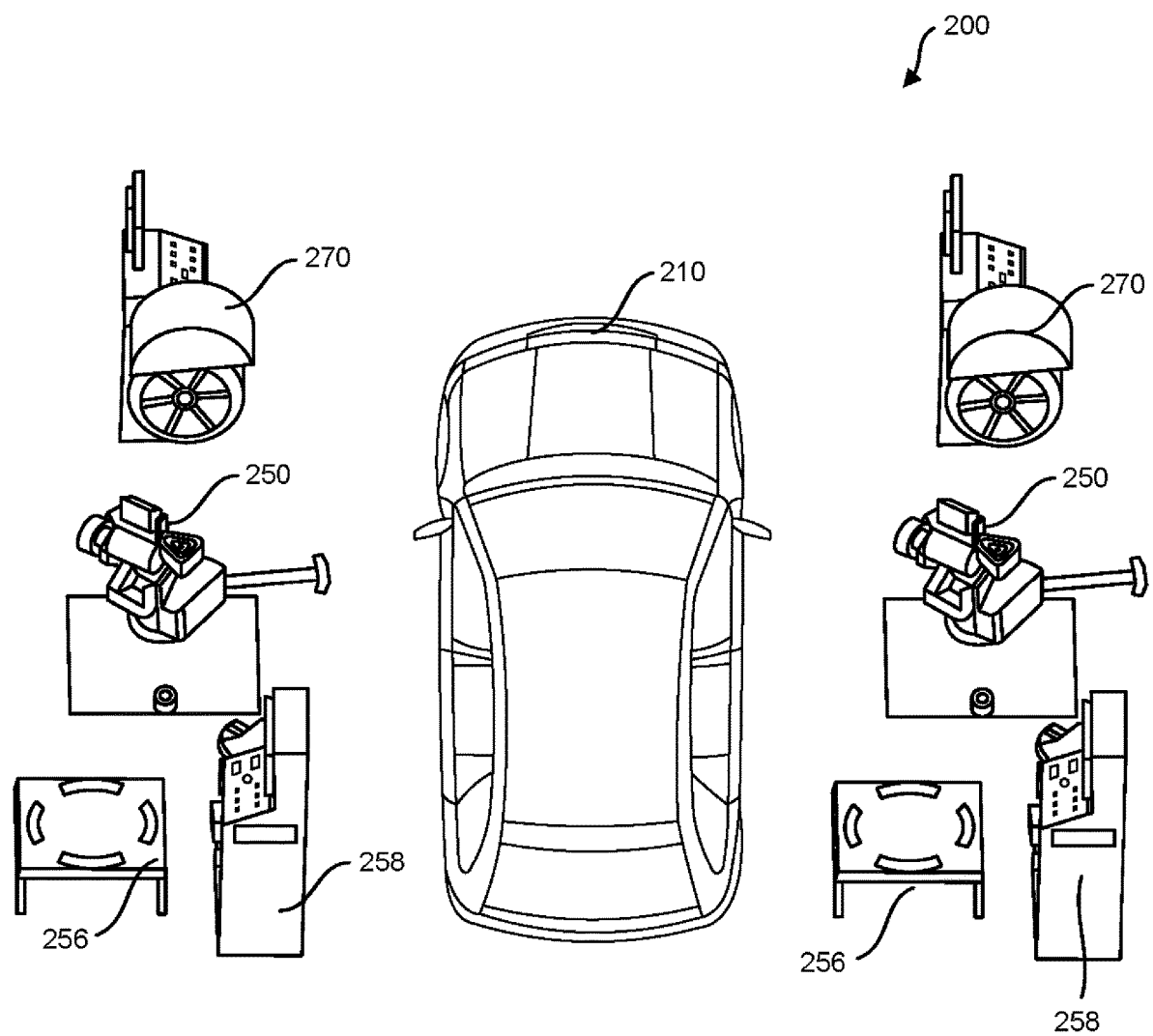
FIG. 2A illustrates an example of an automated wheel removal and wheel replacement station.

FIG. 2A illustrates an example of an automated wheel removal and wheel replacement station 200. The example illustrates a vehicle 210 positioned over a vehicle lifting device 140 (not shown). In one embodiment of the station 200, two robotic apparatus 250 (also referred to as 150 in FIG. 1) are positioned in a proximate location where the robotic apparatus 250 can interact with a vehicle 210 and manipulate the wheel fasteners, remove the wheels, and replace the wheels. Additionally, depicted are wheel holding stations 256 where the robotic apparatus 250 may place a removed wheel onto the wheel holding station 256, and/or where a wheel may be positioned in advance of the wheel being placed back onto the vehicle 210. The actual location of the wheel holding station 256 may be positioned in any convenient location for operation of the robotic apparatus 250.

Additionally, a control station 258 may be used for control and operation of the robotic apparatus 250. The control station may be used for manual and/or automated control of the robotic apparatus 250. The control station 258 may receive instructions, commands and other data from the system 100 (as depicted in FIG. 1). For example, a user interface of the system 100 may provide for instructions to directly control the robotic apparatus 250. The control station 258 may be communicatively coupled to control the robotic apparatus 250.

Also, depicted are tire balancing machines 270 that are communicatively coupled to the system 100 (as depicted in FIG. 1).

Figure 2B:
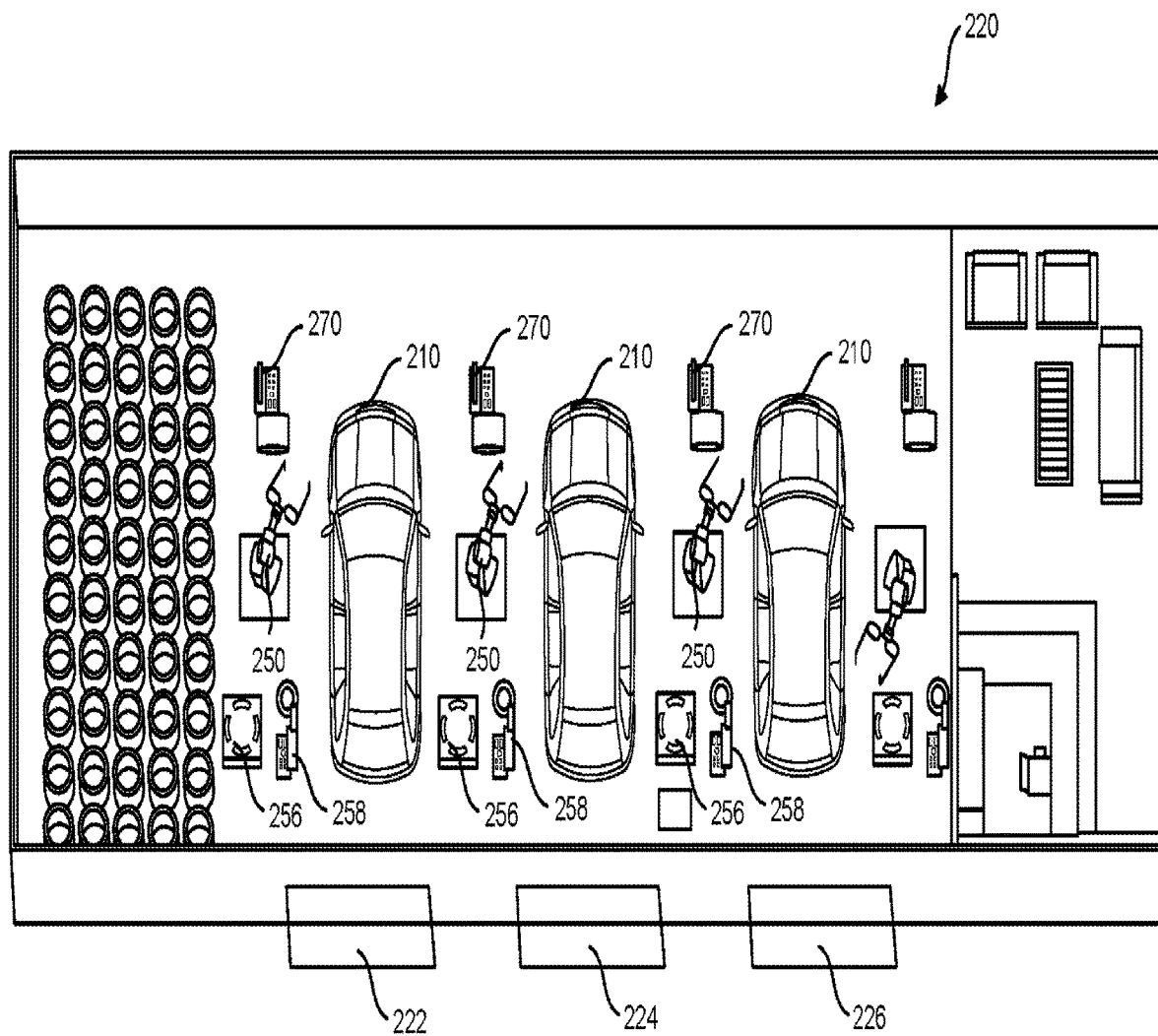
FIG. 2B illustrates an example of automated wheel removal and wheel replacement stations.

FIG. 2B illustrates an example of automated wheel removal and wheel replacement stations. This example illustrates a physical structure 220 with three bays 222, 224, 226. The physical structure 220 includes multiple robotic apparatus 250 (also referred to as 150 in FIG. 1), multiple control stations 258, multiple wheel holding stations 256, and multiple tire balancing machines 270. This example illustrates a configuration where multiple vehicles 210 may be serviced by the robotic apparatus 250 for automated wheel removal, tire change and wheel replacement.

Figure 3:
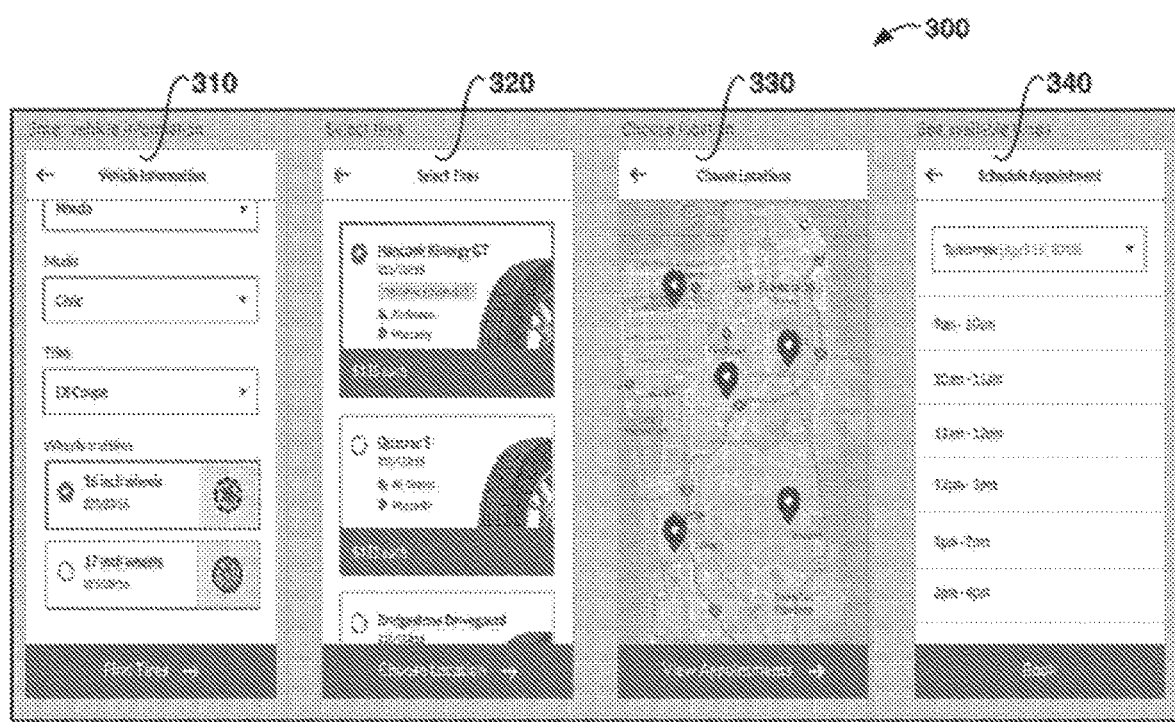
FIG. 3 illustrates an example user interface of the computer system.

Referring to FIG. 3, an exemplary application user interface (300) of the system 100 is disclosed. The application user interface 300 may be presented via a user computing device using a browser, other network resource viewer, desktop or mobile application, or otherwise.

In this example, the system 100 (as depicted in FIG. 1) generates the user interface 300 via an application program or module. The user interface 300 may be used for creating and scheduling a tire change job. The user interface 300 includes a portion of the user interface 310 for obtaining vehicle information. The user interface 300 additionally includes a portion 320 for receiving a selection of a tire. The user interface 300 additionally includes a portion 330 for choosing a physical location for the changing of a tire. The user interface 300 additionally includes a portion 340 for selecting a date and time for scheduling the tire change job. The user interface 300 show available appointment dates and times. Times that are not available are either not shown via the user interface 300, or are displayed but are not selectable by a user.

The system 100 obtains customer order information through a respective website or device application. (An application can herein be described by as a software program that runs on a computer or mobile device.) A user may interact with a device 102 (as depicted in FIG. 1) (e.g. phone, tablet, computer, etc.) that runs and thereby executes an application, for example that has been downloaded from an online application store. The application can generate interactive user interfaces for presentation to the user. Via a user interface of the system 100, a user can specify their vehicle make, model, and year 310. The system 100 prompts the user to provide three sets of information about their vehicle. Namely, the system 100 requests user input on the make, model, and year of the user's respective vehicle. The information is then stored within the database of the system. In response to receiving the requested information of the user's vehicle, a list of available tire types may be presented for selection based on the vehicle information received by the system 100.

The system 100 may prompt the user for additional information, wherein the user selects and purchases a desired tire model(s) via the user interface 320. Additionally, the system 100 prompts the user to input which tire(s) is/are going to be replaced. (i.e. the front driver's side tire, front passenger side tire, rear passenger side tire, etc.) The system 100 stores this set of information within the database 112 and continues the user input process.

The system 100 may request an additional information regarding which commercial location 330 the user prefers to have their tires changed. The application prompts the user for access to their device's (for example, a mobile a phone, or other mobile computing device) GPS ("Global Positioning System") or location services, to locate the nearest locations where the user may have a tire change job performed. The system 100 determines based on the location of the device and provides a listing of one or more locations for the tire replacement.

Optionally, the user may deny access to the application, and instead manually input a location's address as well to be provided with locations where a tire change job may be performed. The user interface displays nearby locations and their distances, and/or distances from the user's address or location, and then the user selects a desired location for the tire change job, and that information is then stored in the system's database.

The system 100 prompts the user to input information about their desired appointment date and time 340. The system 100 checks for available dates and store hours listed by the commercial location for appointment. Once identified, the system 100 presents the appointment slots to the user in the respective device's interface. The system then stores the selected appointment date and time slot entered by the user into the database.

The system 100 additionally may include other user interfaces to provide a user information about the status of a scheduled job. Additionally, the system 100 may include additional user interfaces allowing other users to interact with the system, for example back-office or accounting, technical operators for control or monitoring of the vehicle lifting device 140, robotic apparatus 150, tire removal machine. The foregoing list of user interfaces is for exemplary purposes, and not meant to be limiting.

The system 100 may include a user interface of a mobile application adapted for use on a mobile device. The mobile application may be configured to capture images of the vehicle. The user interface of the mobile device may instruct a user to capture one or more of a frontal image of the vehicle, an image for each of the wheel/tire of the vehicle, and an image of the license plate. The mobile application may submit the images for storage and subsequent processing by the system 100.

The system 100 may receive an image of the tread of a tire and the system 100 may determine that the tire needs to be replaced. For example, in one embodiment, one or more images may be received by the system 100 and the system 100 determines tread depth by creating a 3-dimensional model of the tire from the image. Alternatively, a known object, such as a quarter, may be placed into the tread and an image taken by the application. The system 100 may then identify the depth of the quarter in the tread based on the known size of the quarter. The system 100 compares the size of the quarter to the portion of coverage of tread. The determined portion of coverage of the quarter then may be used to calculate a distance from an intersecting line across the quarter to a perpendicular line to the edge of the quarter. While a quarter is used in the example, other objects may be use as well. Additionally, a ruler or other measurement device may be placed in the tread and an image of the measurement device may be taken. The system 100 then evaluates the image to determine the measurement markings of the device, and calculates the depth of the tread on the tire. The tread measurement is then stored by the system in the database 112, and associated with the vehicle id, and the respective tire (for example, front left, front right, rear right, and rear left)

Additionally, the system 100 may determine a size of the tire and the brand and model of the tire. The system 100 may determine a height of sidewall of the tire based on analysis of the image. The system 100 may also determine the diameter of the wheel on which the tire is mounted.

Additionally, the system 100 may determine the size of the tire by evaluating markings on the tire that identify the tire size. For example, an obtained image of the tire may depict letters on the tire, such as P215/65R15. The system 100 may use optical character recognition to identify the lettering and symbols on the tire. These letters and symbols may be used by the system 100 to identify the size of the tire. The first number 215 represents the section width of the tire, in millimeters. This is the measurement of the tire at its thickest point. The second number 65 refers to the sidewall aspect ratio of the tire, ratio between tire width and height. The third number 15, represents the diameter, in inches, of the wheel on which the tire is mounted. The system 100 may parse the optically recognized characters to determine the tire size. The system 100 may recommend, and/or generate a list of suitable tires for the vehicle based on the optically recognized characters. Additionally, a user interface of the system 100 may be provide a size of the tire to be selected. Moreover, the system 100 may optically read other markings, characters or text on the vehicle, placards or tires indicating a particular tire size for use with the vehicle.

Figure 4:
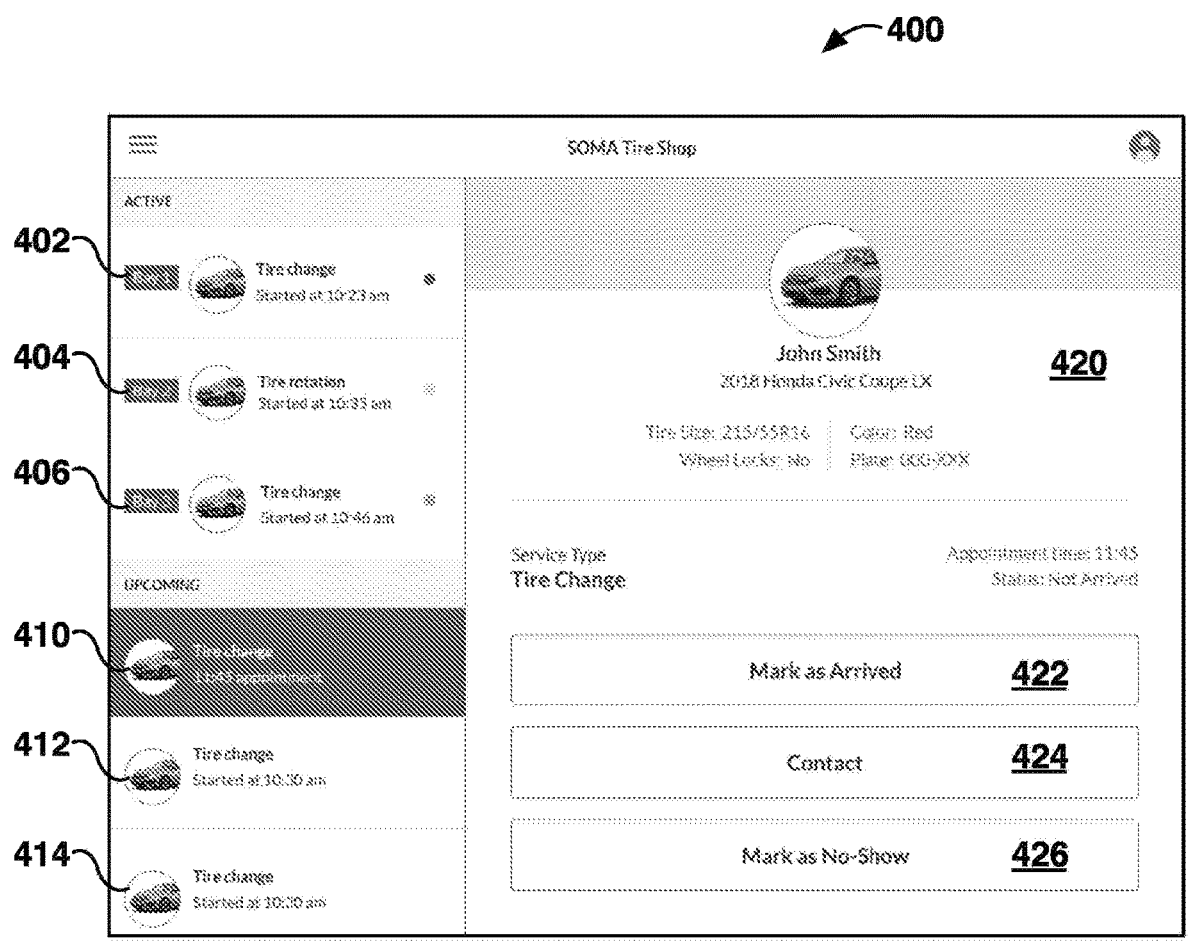
FIG. 4 illustrates an example user interface of the computer system.

Referring to FIG. 4, an exemplary application user interface 400 of the system 100 is disclosed. The user interface 400 depicts active automated tire change operations in progress 402, 404, 406 and other scheduled tire change jobs 410, 412, 414. The user interface 400 may receive a selection of an upcoming scheduled appointment, for example a selection of an appointment 410. The user interface in response to the selection may depict vehicle check-in information in a portion of the user interface 420.

The user interface 400 may receive an input of "marked as arrived" for a vehicle via user interface (UI) affordance 422. The user interface 400 may display one or more of the following information: an image of the vehicle, a description of the vehicle, color of the vehicle, whether the vehicle has wheel locks, the license plate of the vehicle.

The user interface 400 may receive an input via UI affordance 424 to contact a person associated with the tire change job. In response to receipt of an input, a device of the system 100 may automatically initiate a call, text message, e-mail or other communication type to the vehicle owner, or person, associated with the tire change job.

The user interface 400 may receive an input via UI affordance 426 to mark the vehicle as a not arriving for a scheduled tire change job. In response to the input, the system 100 updates the database that the vehicle owner, or person, associated with the tire change job has not shown up for the scheduled tire change job. The system 100 may in turn completely cancel the job, thus releasing particular tires from a hold status in inventory to a status of available. Alternatively, the system 100 may send a communication via text message, automated message or other communication indicating that the scheduled appointment was missed, and requesting whether the vehicle owner would like to reschedule the tire change job to another time. The user may then be presented with a user interface allowing a selection of available dates and times for the previous location selected by the user.

Figure 5:
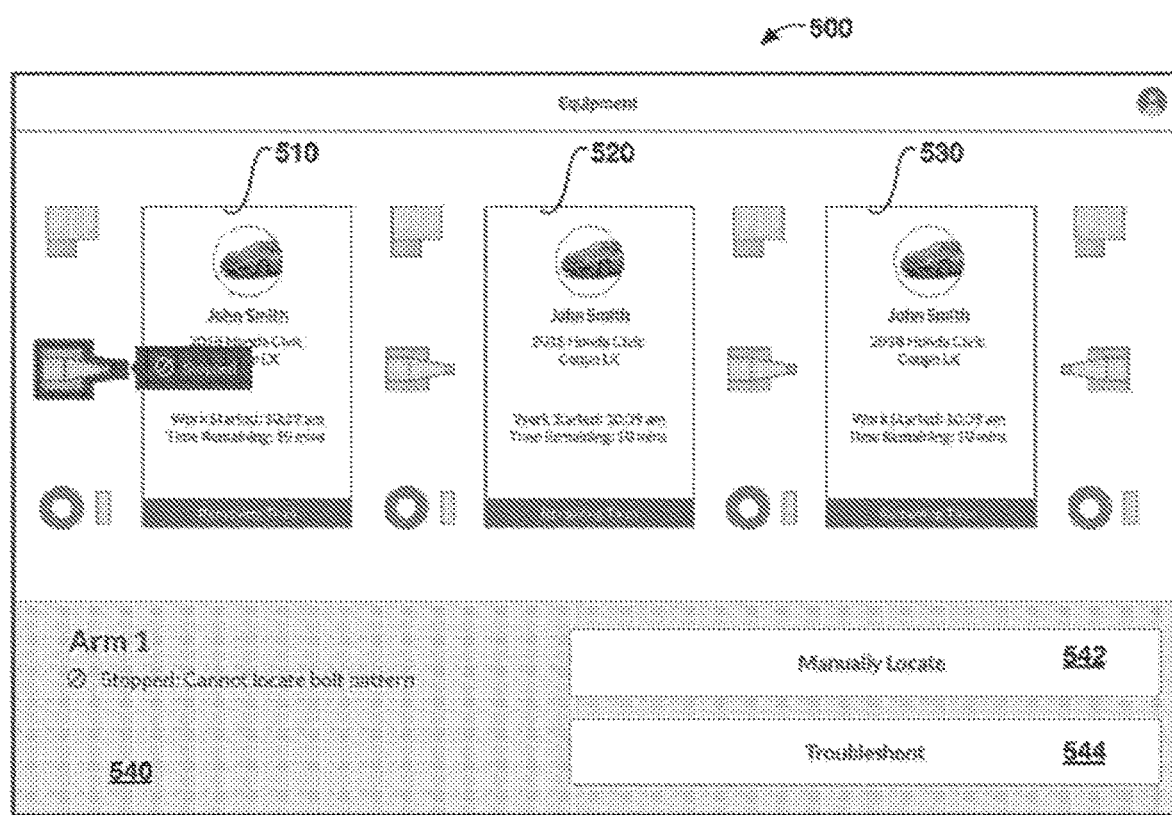
FIG. 5 illustrates an example user interface of the computer system.

Referring to FIG. 5, an exemplary application user interface 500 of the system 100 is disclosed. The system 100 may provide status and other operation information of the robotic apparatus 150, vehicle lifting device 140, tire changing machine 160, and/or the tire balancing machine 170. In this example, portions 510, 520, 530 of the user interface 500 depict status of different tire change jobs in progress. The user interface 500 provides an informative panel of various information, for example process status, error conditions, time to completion of a job, and time that a particular tire change job was started.

In the example user interface, a robotic apparatus 150 is shown as not being able to locate a particular bolt pattern for a wheel. This error condition causes the system 100 to stop the automated wheel removal process and transmit information to the user interface 500 about the error condition. The user interface 500 includes a dynamic portion 540 of the user interface 500 that provides unique UI affordance 542, and real-time photos or video from the robotic apparatus, 544 based on the particular error condition or problem determined by the system 100. Responsive to the particular error of not being able to locate a bolt pattern, the user interface may then provide a manual locate UI button, or trouble shoot UI button to resolve the error condition. The system may use an image of the wheel, and determine the location of the bolt from the image in real-time.

FIG. 6 illustrates an example table for a database 112 of the system 100. This table 600 represents a table that includes information for automating vehicle lifting, vehicle wheel removal/replacement. For example, table 600 may include a unique vehicle identifier, the make of a vehicle, the model of the vehicle, the lug-nut configuration of the vehicle, a vehicle lift height, lifting points coordinates, axle distance. The example table illustrates an embodiment of the General Vehicle Database as described above.

Figure 7:
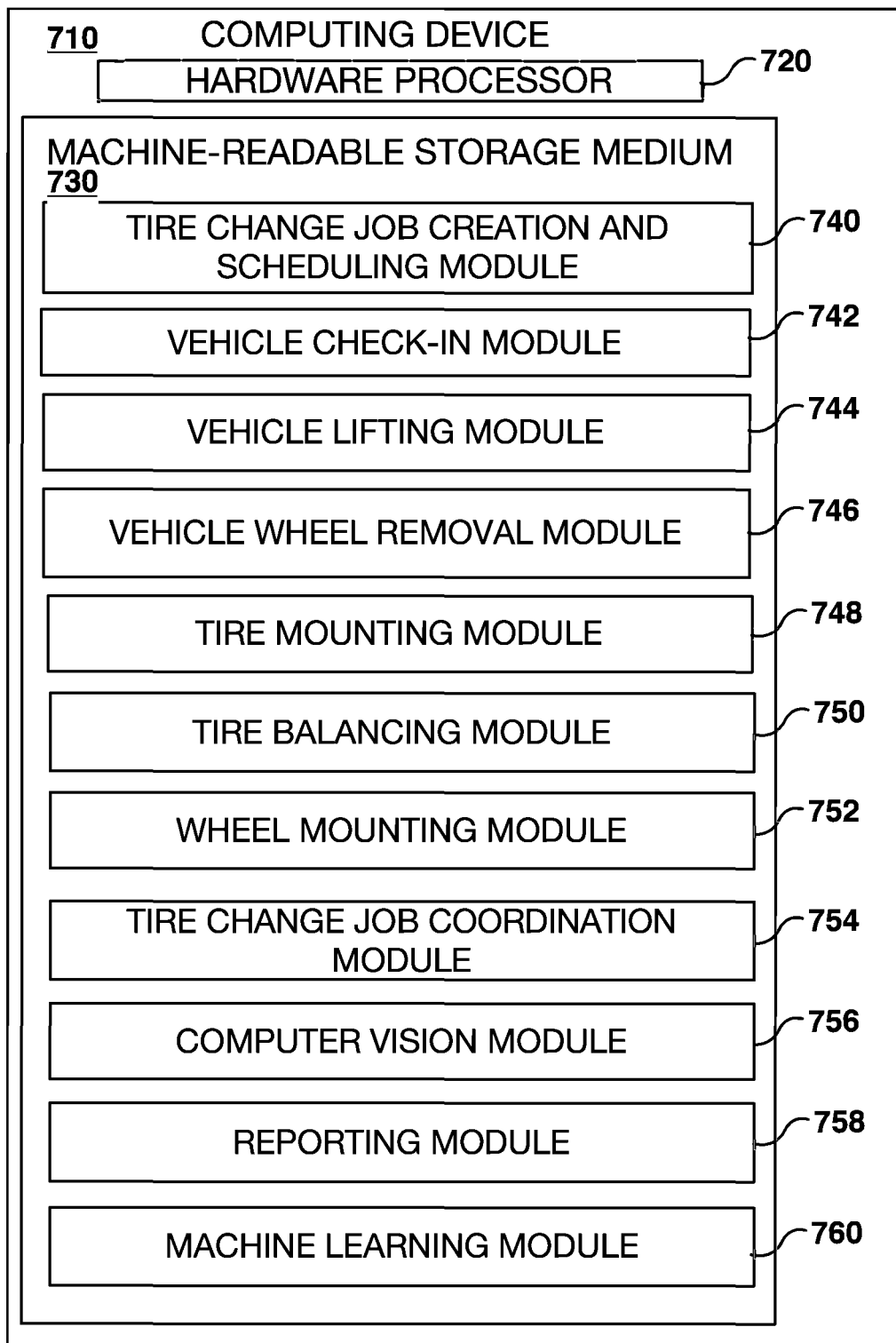
FIG. 7 illustrates system modules of the computer system.

FIG. 7 illustrates various modules 740-760, or processes, that the system 100 may perform. The modules 740-760 may be performed by any number of processors, and by any number of computers. The modules may be executed as software instructions, such as a daemon or service, by a computing device 710 by hardware processor 720. Executable instructions, programs or other code may be stored in a machine-readable storage medium 730. A machine-readable storage medium, such as 730, may include both volatile and nonvolatile, removable and non-removable media, and may be any electronic, magnetic, optical, or other physical storage device that contains or stores executable instructions, data structures, program modules, or other data accessible to processor 720, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals. The machine-readable storage medium may be encoded with executable instructions and/or program code for performing the methods described herein. While the above describes discrete modules, the modules above may be combined in any manner to perform the methods described herein.

Figure 8:
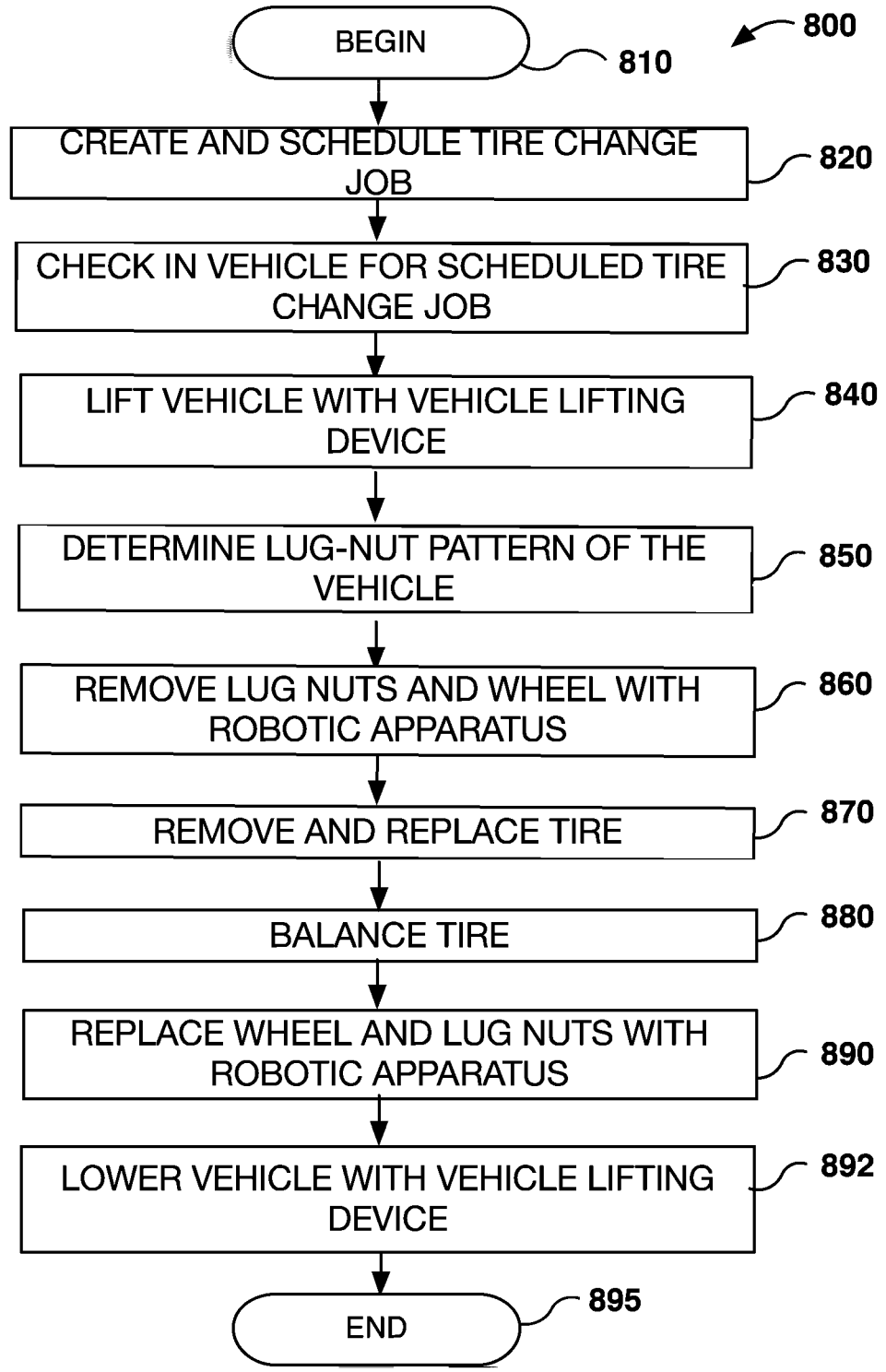
FIG. 8 illustrates an example overview of a method for automated wheel removal and wheel replacement.

FIG. 8 illustrates an example method 800 for automated wheel removal, tire change, and wheel replacement. In general, the method begins (block 810) with a tire change job being created and scheduled (block 820). The method then checks in a vehicle for a scheduled tire change job (block 830). The method then lifts the vehicle with a vehicle lifting device (block 840). The system 100 determines a lug-nut pattern for the vehicle (block 850). The lug nuts and the wheel are removed using a robotic apparatus (block 860). The removed wheel is positioned to a tire removal and replacement machine where the tire is removed from the wheel, and a new tire placed onto the wheel (block 870). The wheel with the new tire is then placed on a balancing machine and balanced with the application of weights to the wheel (block 880). The wheel is then placed back onto the vehicle, and the lug nuts are replaced using the robotic apparatus (block 890). When all wheels are secured onto the vehicle, then the vehicle is lowered by the vehicle lifting device (block 892).

Job Scheduling

Figure 9:
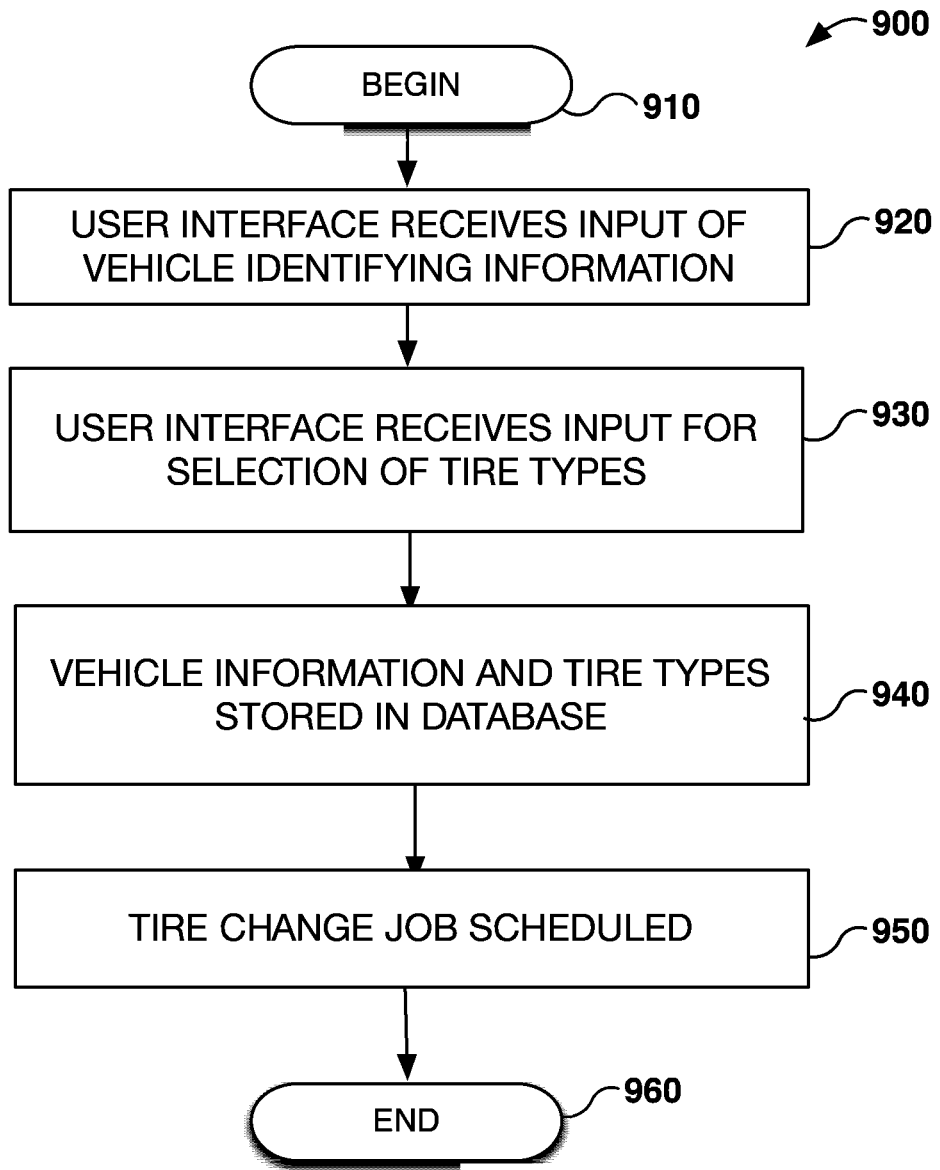
FIG. 9 illustrates an example method for tire change job creation and tire change job scheduling.

As described in FIG. 7, the system 100 may include module 740 which performs operations for the creation and scheduling of tire change jobs. FIG. 9 and the description below further describe a method 900 for the tire change job creation and scheduling. In general, the method 900 begins (block 910) with the receipt of vehicle identifying information from a user interface (block 920) of the system 100. A user interface of the system 100 receives input for selection of the tire types (block 930). The vehicle information and tire types are stored in a database (block 940). A selection for date and time for a tire change job is selected via the user interface. The tire change job is then scheduled (block 950).

For example, some of the information received via the user interface by the system 100 includes one or more of the following customer information and vehicle information. The customer information may include customer number, address, billing information. The vehicle information may include year, make and model of the vehicle, the vehicle's license plate number, vehicle identification number and color.

The system 100 determines a suggested tire type based on the provided vehicle information. For example, the system 100 may include an inventory determination process that interacts with a database 112 having stored information describing different tires that may fit a vehicle's wheel, and retrievable from the database 112 based on the vehicle year, make and model.

The system 100 determines whether the requested tires are available in inventory. The system 100 may also be communicatively coupled to a remote inventory system, such as a system of a tire supplier, distributor, reseller or manufacturer. The system 100 may search the remote inventory system to also determined tire availability, and place orders for tires. Optionally, the system 100 may determine if the required tires are not available in inventory, and automatically places an order for the required tires. The system 100 may determine a date when the required tires will be received at a physical location. The system 100 may determine a tire change job based on the availability of the requested tires and schedule a tire change job when the tires will be received at the physical location. The date of the tire change job is provided to the user via one or more communications methods, such as via a user interface, an e-mail message, SMS message, a social media application, or otherwise. The user interface may show dates where the tires can be delivered to inventory for a tire change job.

Inventory. When the ordered tires are physically received, the tires are either scanned if the tire has a bar code, and the system 100 updates the tire inventory with an updated quantity for that tire type, and/or the system 100 receives a manual input that updates the quantity for the respective tire type. Each of the type of tires may have an associated stock keeping unit (SKU) for inventory management purposes.

Ideally, the tires are stored in a physical location where a robotic tire retrieval apparatus may obtain them. The system 100 may store information about a physical location of the tires in inventory. For example, the system 100 may store bin data with row and column positions of where a tire is located. The robotic tire retrieval apparatus may be instructed by the system 100 to retrieve a particular tire based on a tire retrieval event. As discussed below, a tire retrieval event may be, for example, a vehicle check-in event when the system 100 determines that a vehicle has arrived for a scheduled tire change job.

The system 100 identifies the tires as being dedicated to a particular tire change job and update the database 112 to reflect a status indicating the tires are reserved. The system 100 may include other marking apparatus or devices to temporarily mark a tire as reserved. When tires are received or delivered to a physical location, if received tires when scanned in for inventory are identified as being required for a particular job, then the system 100, may use a marking or printing device, to mark or print on the tire a code or alphanumeric designation for the particular tire change job. If a tire change job is canceled as discussed below, then the system 100, may locate the physical tire and remove the tire change job identifier from the tire.

Reminders. The system 100 may generate reminders and send them to a particular user associated with a tire change job. The reminders may be sent to the user, for example, two days before the scheduled tire change job. The system 100 then may receive a confirmation that the user will attend the scheduled tire change job. If the system does not receive a confirmation, then the system 100 may send an electronic notification to the user indicating that the tire change job has been canceled. If a tire change job has been canceled, then the system 100 releases the particular required tires to available inventory by updating the Inventory Database.

Vehicle Check-In

A vehicle arrives at a physical location for a scheduled tire change job. The physical location ideally is a structure with one or more bays where a vehicle may enter the bay for replacement of the tires.

Figure 10:
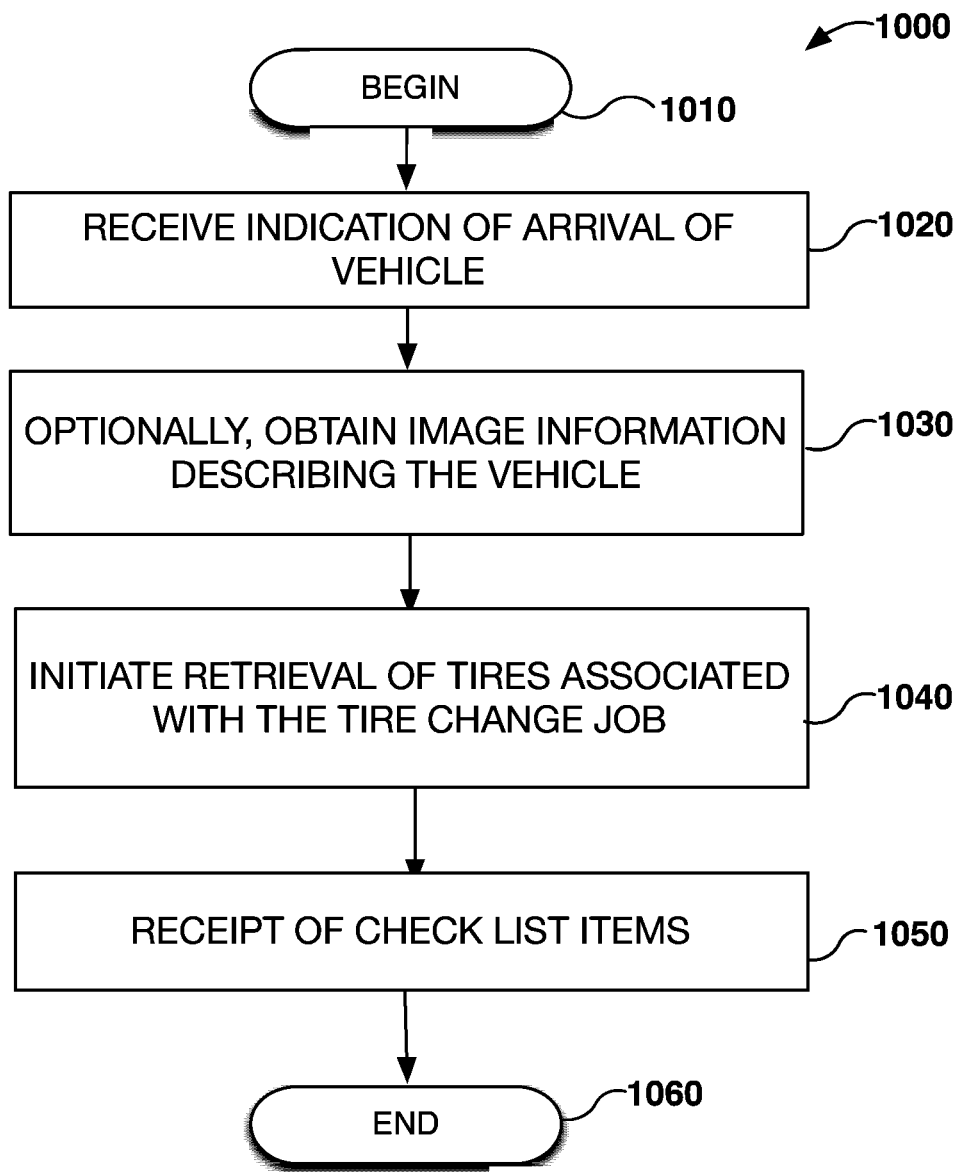
FIG. 10 illustrates an example method for vehicle check-in for a scheduled tire change job.

As described in FIG. 7, the system 100 may include module 742 which performs operations for checking in a vehicle for a scheduled tire change job. FIG. 10 and the description below further describes a method 1000 for checking in a vehicle for a scheduled tire change job. In general, the method 1000 begins (block 1010) with the receipt of an indication of arrival of a vehicle (block 1020). For example, via receipt of an input via a user interface of the system 100, and/or an automated detection of the arrival of a vehicle. The system 100 optionally obtains image information describing the vehicle (block 1030). For example, digital images of the wheels may be taken by a mobile device and submitted to the system 100.

The system 100 receives a vehicle check-in indication. The system 100 may receive information about the arrival of the vehicle through automated processing, partially-automated processing, or by receipt of manually input information via a user interface of the system 100. The physical location may have one or more cameras that obtain images of arriving vehicles. Optionally, a mobile device may be used to obtain images of the vehicle. The system 100 receives images of the vehicle and determines if the vehicle is a vehicle slated for a scheduled tire change job. For example, the system 100 may use computer vision techniques to identify, the color, size, license plate number, or other characteristics of the vehicle. The system 100 may determine there is a color match, license plate match, vehicle size match, etc. The system 100 may determine a confidence level or value that the observed vehicle is likely the vehicle scheduled for a tire change job, and if the confidence level is met or exceeded, then the system 100 performs a vehicle check-in event.

In response, to checking in a vehicle, the system 100 initiates retrieval, via a tire retrieval apparatus, to pull the specific tires from inventory based on the tire change job information. The check-in of the vehicle may initiate a vehicle check-in event causing the system 100 to direct a robotic tire retrieval apparatus to retrieve from a stored location, the required tires for the scheduled tire change job. For example, the check-in event causes the system 100 to instruct a tire retrieval robotic apparatus to obtain the particular tires for the tire change job. As discussed above, the tires may have been marked with a code or alphanumeric designator. The system 100 may confirm the retrieved code is correct when the tire retrieval robotic apparatus retrieves the tire.

Also, the system 100 may before the vehicle is checked in, initiate retrieval of tires from inventory prior to the vehicle's arrival for a scheduled tire change job. For example, the system 100 may determine a time for the performance of a tire change job. The system 100 may initiate retrieval of the tires based on a predetermined time amount, such as x minutes prior to the scheduled tire change job. For example, if a tire change job is scheduled for 2:00 p.m. on a particular date. On the particular date, the system 100 may initiate retrieval of the tires 30 minutes, or some other time period, prior to the scheduled tire change job.

Additionally, location information of the particular tires needed for the tire change job may be displayed via a user interface, thus allowing manual retrieval of the tires from an inventory location. Lastly, the vehicle check-in process may include confirmation for check list items (block 1050) to be completed. For example, a user interface of the system 100 may present a dynamic set of items that should be confirmed or validated by a user. For example, the user interface may present confirmation items, especially for aspects of the process that may need to be performed manually:

a. Are all hub caps removed?
   b. Are all tire valve caps removed?
   c. Do any of the wheels have wheel locks?

Once the check list items have been marked as completed, the system 100 may initiate the check-in event. In addition to causing the retrieval of the tires, the check-in event may cause the robotic apparatus 150 and/or the vehicle lifting device 140 to perform preparatory operations, and/or move into an initial position. For example, in response to the check-in event, the vehicle lifting 140 device may activate sensors and maneuver portions of the vehicle lifting device to positions for the particular vehicle being checked-in, such as moving lifting sections of the vehicle lifting device 140 to locations for lifting points of the check-in vehicle in advance of the vehicle moving over the vehicle lifting device. Also, in response to the check-in event, the robotic apparatus 150 may activate sensors, and/or select an appropriate socket based on the size of lug nut for the particular vehicle as determined by the system 100 from a general vehicle database, or as determined from an input from a user interface used to check-in the vehicle. Additionally, the robotic apparatus 150 may move into a location suitable for the lug nut and wheel removal operation. For example, if two robotic apparatus 150 are used on one side of a vehicle, the system may move the robotic apparatus to positions based on the axle distance obtained from the general vehicle database for the particular vehicle.

Wheel Assessment. During the vehicle check-in, or later in the process during wheel removal operations, images of each of the wheels and tires may be obtained the system 100. Additionally, as previously discussed images of the wheels and tires may be obtained by a user interface of the system 100 via a mobile application. The obtained images may be analyzed by the system 100. The system 100 receives the images and stores them in a database 112 and associates the images to the particular scheduled tire change job. An image may be associated with the location of the vehicle of where the image was taken, for example a first image may be designated front left side, a second image may be designated left rear side, a third image may be designated right front side, and a fourth image may be designated right rear side. The system 100 may analyze the images and determine whether the wheels are suitable for automated wheel removal and may also determine whether the wheel has any pre-existing damage. For example, the system 100 may analyze an image to detect anomalies in the wheel that indicates damage, or that the wheel is covered in dirt or grime. If these anomalies are detected, the system 100 may indicate the particular wheel or vehicle is not suitable for automated wheel removal. A user interface of the system 100 may display an indication that a particular wheel is not suitable for wheel removal operations.

Vehicle Lifting

Figure 11:
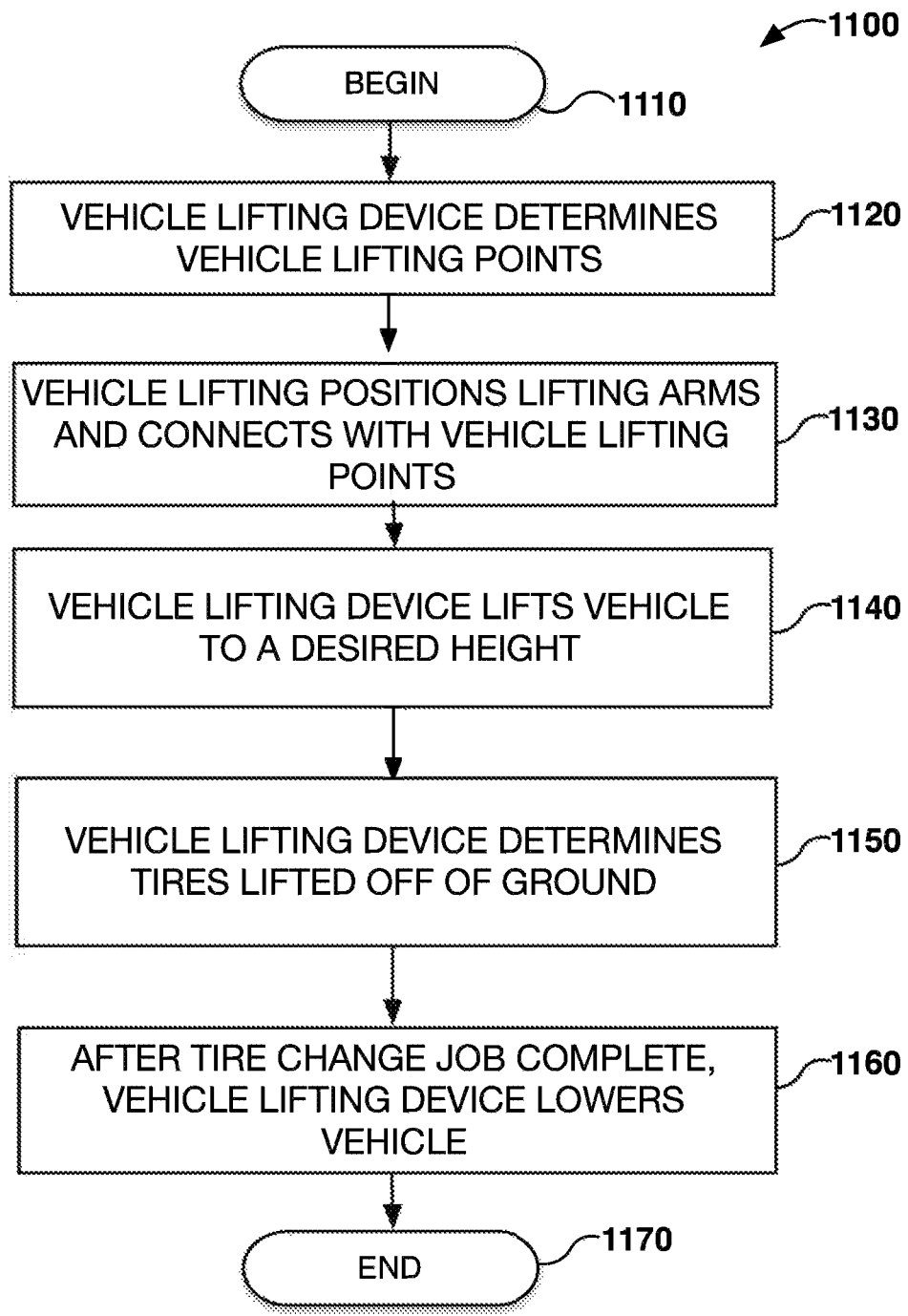
FIG. 11 illustrates an example method for vehicle lifting.

As described in FIG. 7, the system 100 may include module 744 which performs the method of lifting a vehicle with a vehicle lifting device. FIG. 11 and the description below further describes a method 1100 of lifting a vehicle with a vehicle lifting device. Various embodiments of vehicle lifting devices are described herein. In general, the method 1100 begins (block 1110) with the vehicle lifting device 140 determining vehicle lifting points (block 1120). The vehicle lifting device 140 positions lifting arms and connects with vehicle lifting points (block 1130). The vehicle lifting device 140 lifts the vehicle to a desired height (block 1140). The vehicle lifting device 140 determines the tires are lifted off of the ground (block 1150). After the tire change job is completed, the vehicle lifting device 140 lowers the vehicle (block 1160) back to the ground.

The vehicle is maneuvered over the vehicle lifting device 140. In certain embodiments, the vehicle lifting device 140 is affixed to the ground, or alternatively the vehicle lifting device 140 may be mobile and moved under a stationary vehicle. The vehicle lifting device 140 is communicatively coupled to the system 100. The actuation of the vehicle lifting device may be mechanical, pneumatic, hydraulic or electric. In one embodiment, the vehicle lifting device 140 has articulating arms with lifting sections that contact lifting points of an undercarriage of a vehicle. The vehicle lifting device 140 has at least two lifting sections that are maneuvered to vehicle lifting points.

The system 100 determines the location of the vehicle lifting points. The vehicle lifting device 140 is operatively connected to the system 100. The system 100 stores vehicle lifting point locations for multiple vehicles, for example, a general vehicle database 112 may include locations of where the lifting sections should be placed. The database 112 may store the locations, for example as dimensional coordinate positions 100. The system 100 instructs the lifting sections of the vehicle lifting device 140 to maneuver to lifting locations. The system 100 may identify the vehicle lifting points of the vehicle using computer vision, and obtain images describing the undercarriage of the vehicle. The system may recognize or determine suitable locations under the vehicle, and identify the locations as vehicle lifting points.

In certain cases, the general vehicle database may not have lifting locations fora particular type of vehicle. In this case, the vehicle lifting device 140 is placed into an observation mode, where sensors coupled to the lifting sections obtain information about the undercarriage. In one embodiment, the arms move to a first location, and then perform an articulating or sweeping motion when the system 100 monitors for a suitable lifting point. Once found, the system 100 stores dimensional information about the lifting points and associates the lifting point dimensions with the particular, year, make and model of the vehicle. In this manner, the system 100 may later use the lifting point locations for similar vehicles.

In another embodiment, the system 100 may obtain digital images, such as live streaming video, via cameras coupled to the arms of the vehicle lifting device 140. The video may be displayed via a user interface where an operator may instruct, via the interface, movement of one or more arms to a lifting location. The system 100 may receive confirmation via user input that the arms have been positioned, and in response to the input the arms of the vehicle lifting device 140 may be locked into place. The system 100 may store dimensional information about the lifting points and associate the dimensional information with the particular, year, make and model of the vehicle. In this manner, the system 100 may later use the lifting locations for similar vehicles.

Once the arms and lifting sections are maneuvered into place, the system 100 instructs the vehicle lifting device 140 to lift the vehicle vertically. The lifting section of the vehicle lifting device 140 then physically connects with the lifting points of the vehicle. The system 100 then continues actuating the lifting section of the vehicle lifting device to cause vertical movement of the vehicle. The vehicle lifting device 140 stops at a predetermined height. A user interface may receive operator input and the system 100 may incrementally move the vehicle lifting device upwards or downwards. Additionally, the user interface includes a manual override input to stop movement of the vehicle lifting device 140. If the manual override input is received, then the system 100 causes the vehicle lifting device 140 to immediately stop.

The system 100 may use sensors to obtain information about whether the vehicle tires have been lifted off of the ground. For example, light detection, proximity sensors, digital cameras, or other sensors may obtain information. The system 100 then determines if there is a threshold level of spacing between a tire and the ground. Once a certain threshold distance of the tires from the ground is achieved, then the system 100 stops the vehicle lifting device 140.

Additionally, the general vehicle database may include lifting height information. The lifting height information is used by the system 100 to instruct the vehicle lifting device 140 to move the lifting sections to a desired height level. The system 100 may retrieve the lifting height information and direct the vehicle lifting device 140 to lift the vehicle to a desired height.

Lug-Nut and Wheel Removal

Figure 12:
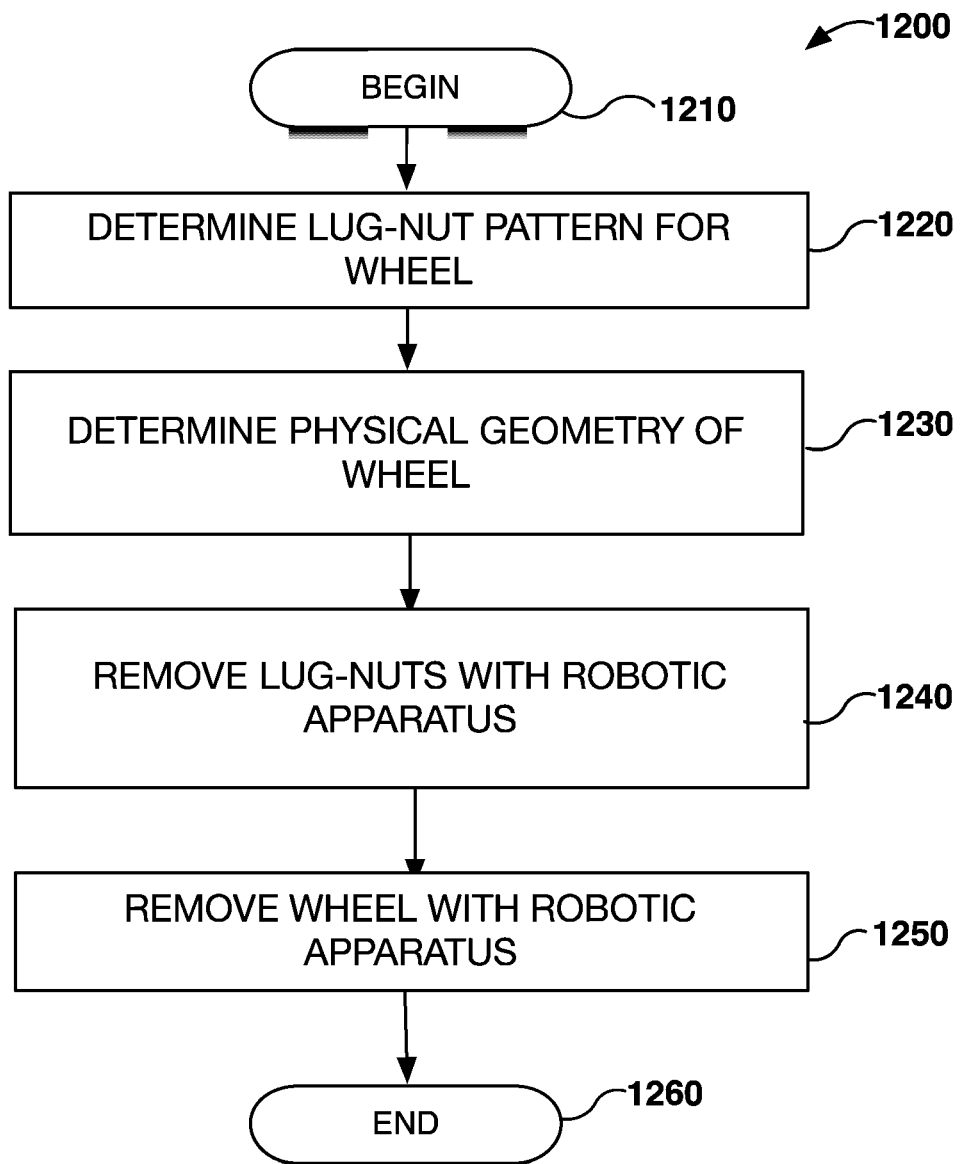
FIG. 12 illustrates an example method for automated wheel removal.

As described in FIG. 7, the system 100 may include module 746 for performing operations of removing a wheel from a vehicle. FIG. 12 illustrates a method 1200 for automated lug-nut and wheel removal. The method begins (block 1210) with the system 100 determining the lug-nut pattern for a wheel (block 1220). The system 100 determines the physical geometry of the wheel of a vehicle (block 1230). The system 100 then removes using a robotic apparatus the lug-nuts from the wheel (block 1240). The system 100 then removes the wheel from the vehicle (block 1250).

Before, during or after lifting of the vehicle, the system 100 may direct the robotic apparatus into a first wheel removal position. Depending on the configuration of the robotic apparatus 150, if a mobile robotic apparatus such as one attached to rail guide, the body of the robotic apparatus and articulating components all move to the first wheel removal position. If the robotic apparatus is affixed to the ground, then the tooling head of the robotic apparatus is moved into a first wheel removal position. Setting the robotic apparatus, and/or the tooling head, to the first wheel removal position places the robotic apparatus in proximity to a wheel of the vehicle, thereby allowing the robotic apparatus to perform a wheel removal procedure.

The system 100 may detect if the lug nuts have locks. The system 100 may detect a pattern on the surface of a lug nut by analyzing an image and determining that the lug nut may have a lock. The particular lug nut lock pattern may be associated in the general vehicle database with a required robotic tool attachment. For removal of a locked lug nut, the robotic apparatus may have specialized keyed sockets that are used to remove the locked lug nut.

The system 100 determines a lug-nut pattern for the wheel. The lug-nut pattern may be obtained from the database as associated to a particular year, make and model of the vehicle. The system 100 may have stored in the database 112 associated dimensional information about the lug-nut pattern which the system 100 uses to move one or more torque wrenches coupled to the robotic apparatus 150 for removal and replacement of lug nuts.

Additionally, the robotic apparatus 150 may determine a physical geometry of the wheel as to the tooling head of the robotic apparatus. The robotic apparatus for example may have lasers or other types of sensors that the robotic apparatus 150 may use to determine distances, and/or proximity, of the robotic apparatus to a vehicle's wheel. The robotic apparatus 150 may determine a plane and/or orientation of the vehicle's wheel in a three-dimensional space. While distance sensors may be used, additionally an obtained 3-D point cloud from LiDAR sensors, or a stereo vision system for 3-dimensional depth perception may be used. Determining an orientation or plane of the wheel assists the robotic apparatus in determining proper alignment of a socket when being placed onto a lug nut. If the plane of the wheel is determined, then the robotic apparatus can move linearly in a perpendicular fashion toward the wheel. The system 100 may then maintain the socket in a 90 degree orientation to the wheel as the socket is moved towards the wheel by the robotic apparatus 150. If the socket orientation to the plane of the wheel is off by a few degrees, then the socket may not properly seat onto a lug nut.

Additionally, the system may obtain video images, or a series of images, from a digital camera depicting the vehicle in motion. The system 100 may analyze one or more wheels depicted in the images, and compute a plane of the wheels. The plane of the wheel in multiple images may be analyzed to determine whether the wheels if the alignment of the is off canter, or off angle from a normal angle. The system 100 then may record the wheel as needing alignment.

Additionally, the system 100 may determine a lug nut pattern via computer vision processing where a digital image of the wheel is obtained. The system 100 processes obtained images using object detection techniques to identify lug nuts in the image of the wheel. The system 100 can determine based on the number of lug nut objects detected, the type of lug nut pattern (i.e., 4, 5, 6 or 8-lug nut pattern). The system 100 may also calculate the centroid of the lug nuts, and the spatial dimensions for each of the lug nuts.

The system 100 may then use the determined lug-nut pattern, and/or the determined physical geometry of the wheel to maneuver the robotic apparatus tooling head from one location to another location to place one or more sockets onto a respective lug nut.

The robotic apparatus can dynamically adjust between removal of lug nuts for a 4-lug nut configuration, a 5-lug nut configuration, or a 6-lug nut configuration. This dynamic aspect of the system 100 is quite different from an unchanging system that has a fixed-known configuration. Additionally, even within a particular lug nut configuration, for example a 5-lug nut pattern, the spacing of the lug nuts are variable among different vehicles.

The system 100 addresses this variability by multiple means. For example, based on the particular vehicle information, the General Vehicle Database may store the type (4, 5, 6, or 8-lug nut pattern), and the dimensional spacing of the lug nuts. Once a first lug nut position is located on the wheel, then the system 100 may calculate or determine the position of the remaining lug nuts of the wheel and maneuver the robotic arm accordingly.

Socket Selection

The robotic apparatus 150 may use or be fitted with one or more sockets for the removal of lug nuts. The sockets may be detachably affixed to a torque wrench end of the robotic apparatus 150. The system 100 may determine a socket size to be used to remove a lug nut from a wheel. The determination of the size of a lug nut may be performed through a computer vision process where an image of a wheel is obtained, and the system processes the image, and detects a size of the lug nut. Based on the determined size of the lug nut, the system 100 would instruct the robotic apparatus 150 to pick the appropriate socket size for the lug nut.

Additionally, a user interface of the system 100 may allow for a selection of a lug nut size. For example, the system 100 would receive a user input for the size of the socket needed to remove the lug nut. In response to the selection, the robotic apparatus would choose the selected socket size. For example, the user interface may display information for different socket sizes. The user interface would receive an input for a desired socket size to be used to remove the lug nuts from the wheel.

As discussed previously, a user of the system may input their vehicle information for a tire change job. Based on the vehicle information, such as make, model, and year, the system 100 may have stored for retrieval in the database 112, such as the general vehicle database, a particular socket size that is typically used for the particular vehicle associated with the vehicle information. When removing a lug nut, the system 100 may search for a stored data value for a socket size to be used, and then the system 100 may direct the robotic apparatus 150 to select or use a socket based on the data value for the socket size.

The robotic apparatus 150 may select or be fitted with different socket sizes. In one example, the robotic apparatus chooses from 6 different socket sizes, 3 metric sizes (17 mm, 19 mm, 21 mm) and 3 standard size (¾", ¹³⁄₁₆", ⅞"). The robotic apparatus 150 may have a tray or compartment where the group of sockets may be stored, and the selected socket may be attached to the torque wrench of the tooling end of the robotic apparatus 150.

Additionally, based on the vehicle information, the system 100 may choose from the group of 3 metric sockets, or choose from the group of 3 standard size sockets for removal of the vehicle's lug nuts. For example, if the make of the vehicle is a Ford and the model is an Explorer, the database 112 may identify the vehicle as using standard size sockets, and accordingly select from among the 3 standard size sockets to remove the lug nuts from the wheel.

Sometimes a socket may have been selected that is either too large, or too small for the lug nut. The system 100 may detect this error condition. For example, the robotic apparatus 150 may maneuver to position a socket over a lug nut. The socket if too small would not fit over the lug nut (i.e., the wrong size of socket was selected). The robotic apparatus 150 may have a feedback sensor, and may determine that the robotic arm cannot move in the direction of the lug nut and place the lug nut onto the socket. The system 100 may determine that an error condition has occurred. The error condition, may be displayed via a user interface 100. When the error condition is determined, then the robotic apparatus may pull the robotic arm back away from the lug nut. A larger socket size may be chosen by the robotic apparatus. For example, if the system 100 originally selected a 17 mm socket from the metric group of sockets, the system 100 may then select the next socket size which may be a 19 mm socket. If the system 100 originally selected a 19 mm socket from the metric group of sockets, the system 100 may then select the next socket size which may be a 21 mm socket. Likewise, if the system originally selected from one of the standard sized sockets, the system would choose the next standard size socket.

In the example of too large of a socket being selected, the socket when placed over the lug nut may impinge upon the wheel. In other words, similar to the case of too small of a socket, the socket may contact the wheel and would not be able to be placed over the socket by the robotic apparatus 150. Using a feedback sensor of the robotic apparatus 150, the system 100 may detect this error condition. The error condition may be displayed via a user interface of the system 100. When the error condition is determined by the system 100 then the robotic apparatus may pull the robotic arm back away from the lug nut. Similar to the example above of choosing another socket sizer, in this example, the system would then select then next smaller socket.

In another example of too large of a socket being selected, the socket may actually fit over the lug nut. However, when the robotic apparatus begins to torque the lug nut with the socket, the socket may not have any resistance from the lug nut or contact the lug nut, and the socket would spin around the lug nut. The system 100 may detect this as an error condition, and may display the error via a user interface of the system 100. When the error condition is determined by the system 100, then the robotic apparatus 150 may pull the robotic arm back away from the lug nut. The system 100 may determine that the socket size was too large due to the spinning of the socket, and the robotic apparatus may choose a smaller socket size.

The user interface of the system 100 may receive an input to resume the removal of the lug nuts. Additionally, in certain situations, an operator may have to manually place a particular socket onto the torque wrench of the robotic apparatus.

The system 100 also may need to slowly rotate the socket when the socket is being placed over a lug nut. For example, the system 100 may direct the robotic apparatus 150 to slowly rotate the socket in either a clockwise or counter-clockwise rotational movement. The rotation of the socket may be performed in discrete rotational distances, for example in a range of 0.1 to 10 mm (0.0003937 to 0.3937 inches). Rotating the socket may allow the socket to be seated over a lug nut if the socket is initially positioned in a way where the internal walls of the socket are misaligned with the side walls of the lug nut. As the socket is being rotated, the robotic apparatus 150 may apply a linear movement towards the lug nut to try to seat the socket. Once the system 100 detects that the socket is moving over the lug nut, then the system 100 may stop the rotation of the socket.

When a socket has been positioned onto a lug nut, the socket begins rotation in a counterclockwise manner to remove the lug nut. The robotic apparatus may include a torque sensor to receive a value for the torque applied to the lug nut. The torque value may be monitored by the system 100 to determine if the value remains within a threshold torque range. If the torque exceeds this value, then possibly the lug nut is frozen onto the wheel hub bolt. The robotic apparatus 150 may cease rotation of the socket and the wheel vehicle operation if this occurs. The system 100 may generate an exception message via a user interface for review by an operator. At this point, possible manual inspection of the bolt may be warranted. Operational exceptions indicating an error, or out of range exception, may be presented via a user interface of the system 100.

Once a lug nut is removed the lug nut is placed by the robotic apparatus 150 individually into a receiving bin, or some other predetermined storage location. The receiving bin may have a sensor, such as a pressure sensor, switch, magnetic sensor, or optical sensor. The bin sensor is communicatively coupled to the system 100. The system 100 records that a lug nut has been placed into a bin. The first bin may correspond to the first lug nut removed, the second bin may correspond to the second lug nut removed and so forth. While the lug nuts could be placed in some other open location and the location position record, the bins provide a secure container to hold the lug nuts. A priori, the bin locations are known to the system 100 allowing the robotic apparatus to place the lug nuts into the bins. Additionally, by having ordered bins, the system 100 may selectively choose the order to replace the lug nuts, for example from 1, 2, 3, 4, 5 (if five lug nuts), or from 5, 4, 3, 2, 1. The lug nuts may be replaced in the same order they were removed, or in the reverse order they were removed, or in some other combination.

The bins may include some type of solvent or other solution that may clean the lug nuts or reduce friction to assist in the reapplication of the lug nuts to the wheel hub bolts.

In one embodiment, the robotic apparatus 150 includes a mechanism for insertion into the lug nut holes of the wheel. For example, the robotic apparatus 150 inserts one or more longitudinal fingers into the holes of the wheel where the lug nuts were removed. The robotic apparatus 150 may place the longitudinal fingers into the lug nut holes and then either move the fingers outwardly toward the tire and/or inwardly toward the center of the wheel, or in some other direction, to seat or mate the longitudinal fingers against the interior surface of the lug nut holes of the wheel. The longitudinal fingers may be coated, or made from a rubber, plastic or other material that avoids damage to the wheel. Additionally, the longitudinal fingers may have integrated pressure sensors that generate pressure data values that are provided to the system 100. The system 100 may monitor the pressure data values and when a threshold pressure data value is achieved, the system 100 would cease the outwardly, or inwardly movement of the longitudinal fingers. Once the longitudinal fingers are seated, then the system 100 directs the robotic apparatus 150 to pull the wheel away from the wheel hub of the vehicle.

In another embodiment to remove the wheel from the vehicle, the robotic apparatus 150 includes a tire gripper to hold the tire while the lug nuts are removed. The tire grippers are maneuvered by the robotic apparatus as controlled by the system 100 into a position where gripping arms may contact a tire, for example the tread of the tire. The robotic apparatus 150 may use sensors, such as a computer vision system, to detect the perimeter of the tire, and guide the gripping arms onto the tire. The system 100 may determine a width value of the tire, and place the gripping arms at locations around the tread portion of the tire to grip the tire at the maximum width of the tire. For example, determining a width value of the tire may be based on a retrieved tire width value associated with the vehicle as stored in a database 112 of the system 100, as determined by sensors of the robotic apparatus 150, as determined by computer vision process performed on obtained images of the wheel and tire by the system, or by other means. When positioned around the tire, the system 100 directs the gripping arms of the robotic apparatus 150 to open between 1.27 mm to 254 mm (0.5 to 10 inches) greater than the determined width value of the tire. Once positioned into place around the tire, the system 100 actuates the gripping arms to close together against the tread of the tire. The gripping arms apply a mechanical gripping force to the tire. The gripping arms may have feedback sensors to determine the force being applied to the tires. The system 100 positions the gripping arms to a determined, or desired gripping force value.

In different embodiments, the gripping of a tire may be done before lug nuts are removed, during lug nut removal, or after lug nut removal. Gripping the tire before lug nut removal helps secure the tire in place to avoid rotation of the tire while the lug nuts are removed.

Once the lug nuts are removed, then the robotic apparatus 150 pulls the wheel from the vehicle wheel hub. The robotic apparatus 150 may include bolt guides that are positioned onto one or more bolts by the robotic apparatus 150. Since the system 100 has already identified the physical location of the lug nuts, after the lug nuts are removed, the robotic apparatus 150 may place a guide or sleeve over a bolt. Doing so, assists in the avoidance of damage to the threads of a bolt. For example, the weight of the wheel and tire may rest on the bolt. When the wheel is removed, the weight against the bolt may cause damage to the bolt as the wheel is pulled from the vehicle. The guide or sleeve may help carry the weight of the wheel and avoid direct contact to a bolt.

Once the wheel is removed, the robotic apparatus 150 may perform an inspection and obtain images of the brake pads and/or the wheel hub and rotor. The system 100 may then perform processing on the images to detect anomalies of the brake pads, the wheel hub and rotor. For example, the system 100 may identify a brake pad and determine that the brake pad width is of a certain dimension or thickness. The system 100 may determine that a brake pad needs replacement by determining the brake pad thickness from an image is within threshold thickness rage. The system 100 may then identify the brake pad as requiring service. The images may be stored by the system 100 in the database 112, and associated with the vehicle undergoing the tire change job. The system 100 may report via a user interface that a brake pad should be replaced. Additionally, the system may generate a report identifying the brake pad, and the particular thickness value determined by the system 100.

After removing a first wheel, the robotic apparatus then proceeds to a second position to remove a second wheel. The robotic apparatus may be directed to move to a specified distance based on retrieved data specifying a distance value, the data being retrieved from the database 112. For example, the general vehicle database may store a value for the axle distance between a front and rear axle of a vehicle. The system 100 retrieves this information and maneuvers the robotic apparatus 150 a linear distance according to the axle distance between the front and rear axle. This allows the robotic apparatus 150 to move to the location of the next wheel on the same side of the vehicle.

Tire Removal and Mounting

The system 100 instructs the robotic apparatus to hand off the removed wheel to a location for tire removal. The wheel is placed onto a mount of a tire removal machine. The system 100 may provide inflation parameters to the tire removing machine, such as a desired air pressure, type of gas such as nitrogen or air. Once the tire is secured onto the tire removal machine, the tire removal machine is initiated. The tire is removed, and a new tire is placed onto the wheel. The tire is then inflated to the desired air pressure that the tire removal machine received from the system 100.

Figure 13:
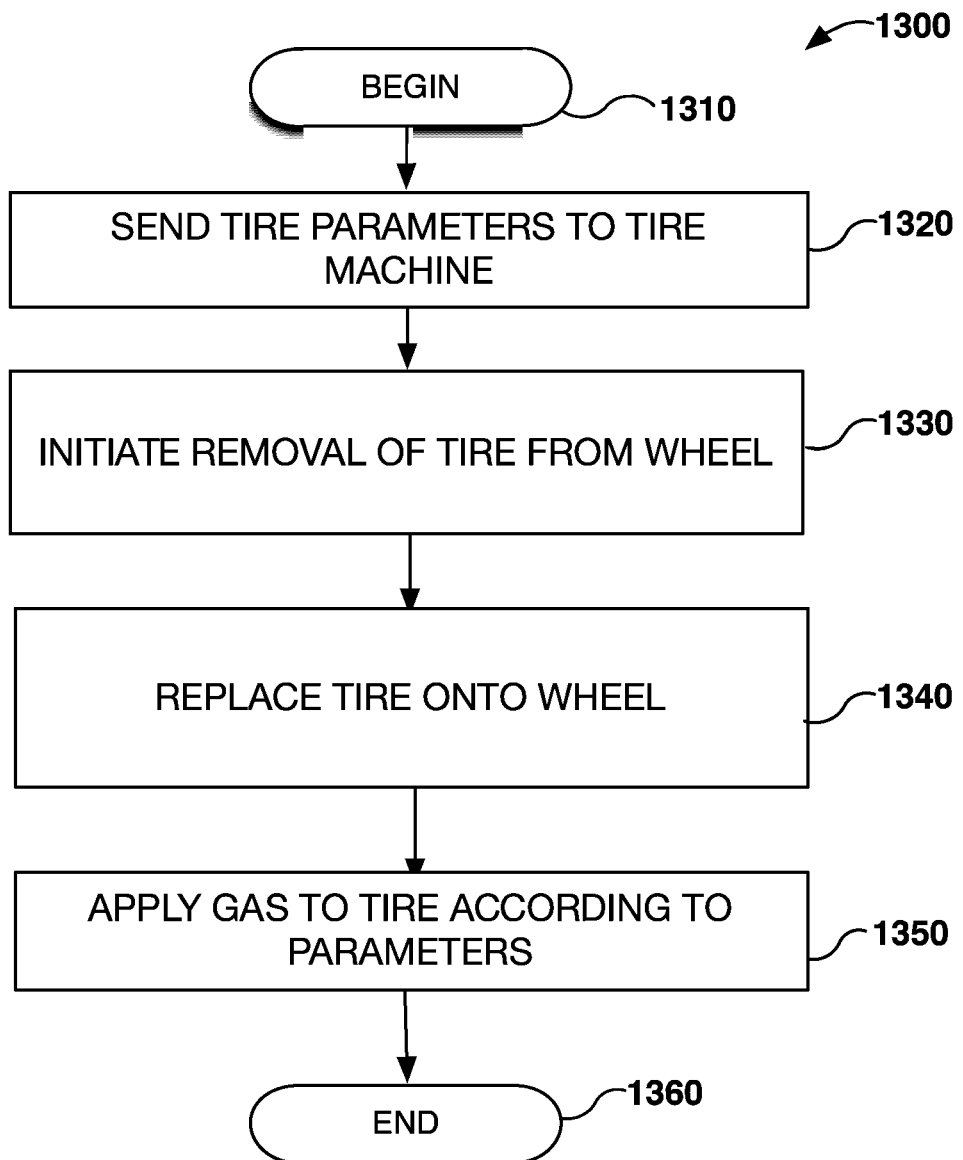
FIG. 13 illustrates an example method for tire removal and replacement.

As described in FIG. 7, the system 100 may include module 748 for performing operations of tire removal and tire mounting. FIG. 13 illustrates a method 1300 for tire removal and replacement. The method 1300 begins (block 1310) with the system 100 sending parameter to a tire removal machine (block 1320). The system 100 may then send instructions to the tire removal machine to initiate removal of a tire from a wheel (block 1330). A new tire that was pulled from inventory for the specific vehicle being serviced is set onto the wheel (block 1340). Gas is applied to the tire according to the parameters (block 1350).

The tire removal machine may have an integral tire feeder configured to receive multiple tires. As described previously, a robotic tire retrieval apparatus may retrieve specific tires associated with a particular tire change job. The system 100 may direct the robotic tire retrieval apparatus to retrieve required tires and move them from an inventory staging location to a tire changing location. A tire changing machine may be fitted with a feeder adapted to receive the tires from the robotic tire retrieval apparatus.

The robotic apparatus 150 and/or the tire changing machine 160 may include a tire deflation/inflation apparatus or subsystem. For example, the system 100 may detect the position of a tire valve stem on the wheel. Sensors may detect the location of the valve stem, for example through computer vision, or other processes. The deflation/inflation apparatus is positioned over the tire valve stem of the wheel. The deflation/inflation apparatus may determine whether the valve cap has been removed. If the valve cap has not been removed, then the deflation/inflation apparatus may unscrew the valve cap and hold the cap until a new tire has been mounted. If the system 100 determines the valve cap has been removed, the deflation/inflation apparatus places a deflation mechanism onto the valve stem. The system 100 may actuate the deflation/inflation mechanism which inserts a pin, rod or ball valve and presses against the valve stem core to release gas or air from the tire. The deflation/inflation apparatus may have a pressure monitor, and the system 100 may monitor the air pressure and cease deflation of the tire when the pressure is within a pressure range of 0 kPa to 103.42 kPa (0 to 15 psi). Once deflation has ceased, the system 100 directs the deflation/inflation apparatus to move away from the tire so that the old tire may be removed by the tire removal machine 160, and a new tire mounted.

For inflation of the newly mounted tire, the deflation/inflation apparatus may be positioned by the system 100 onto the valve stem. The system 100 may actuate a deflation/inflation mechanism to press against the valve stem core. The system 100 may cause the deflation/inflation apparatus then to discharge a gas into the valve stem. The system 100 may monitor the pressure of the gas in the tire, and cease inflation of the tire when the monitored pressure has reached a desired psi value. The type of gas may be automatically selected from a parameter value from the database 112 as associated to the tire change job, vehicle type and/or tire type. The inflation pressure may be based on a parameter value from the database 112 as associated to the tire change job, vehicle type and/or tire type. The system 100 may store the value of the psi as applied to the new tire, and store associate the psi value with the tire change job and/or a particular customer vehicle in database 112. Once the tire is inflated to a desired psi, then the deflation/inflation apparatus may screw a cap onto the tire stem valve.

Tire and Wheel Balancing

Figure 14:
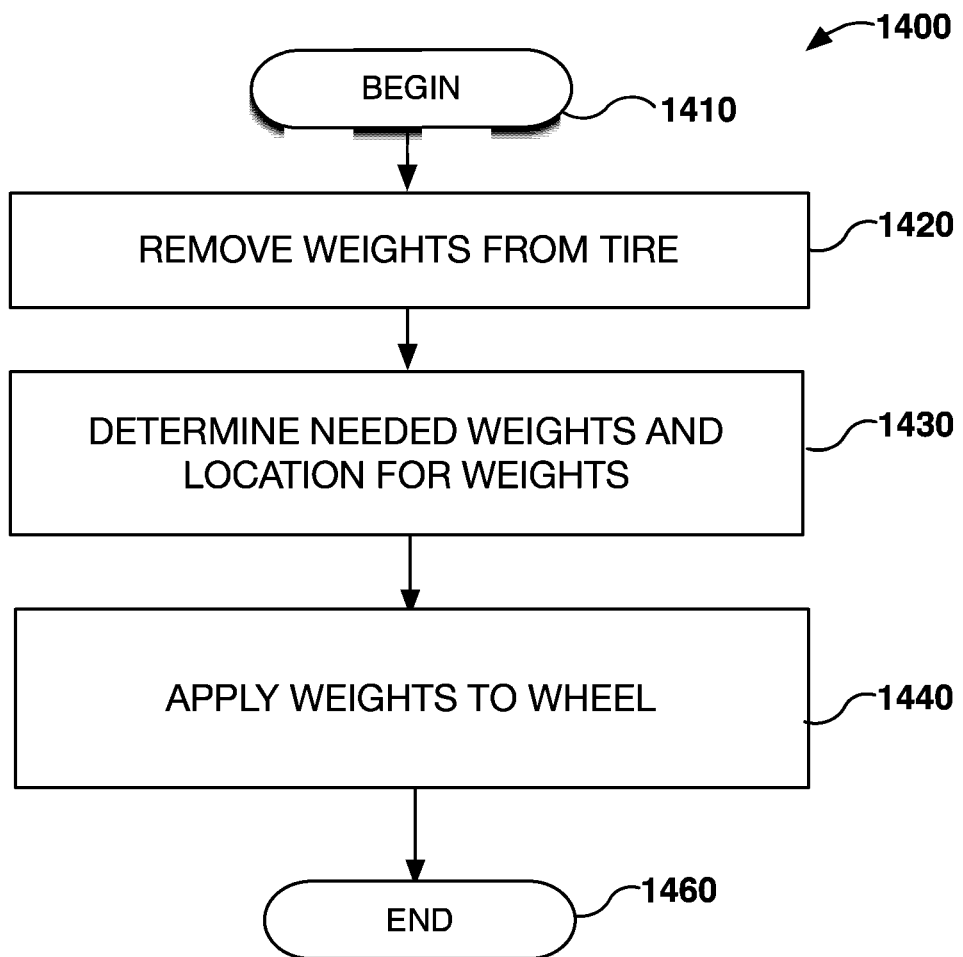
FIG. 14 illustrates an example method for tire balancing.

As described in FIG. 7, the system 100 may include module 750 for performing operations of tire and wheel balancing. FIG. 14 illustrates a method 1400 for tire and wheel balancing. The method 1400 begins (block 1410) with the system 100 directing an apparatus to remove weights from a wheel (block 1420). A tire balancing machine then spins the wheel and tire and determines a location on the wheel for placement of weights (block 1430). Based on the determined location for placement of the weight, a dispensing apparatus applies weights to the wheel (block 1440). An example dispensing apparatus may dispense segmented rectangular weights. The dispensing apparatus is operatively coupled to the tire balancing machine, and/or the system 100. The dispensing apparatus receives an input identifying the amount of weight, and/or the location of where to apply the weight that is needed to balance the wheel and the tire. The dispensing apparatus dispenses the needed amount of weight. The dispensed weights may have an adhesive coating on one side of the weight. The weight may be applied to the wheel by the dispensing apparatus and adhesively affixed to the wheel.

Replace Wheel and Lug Nuts

Figure 15:
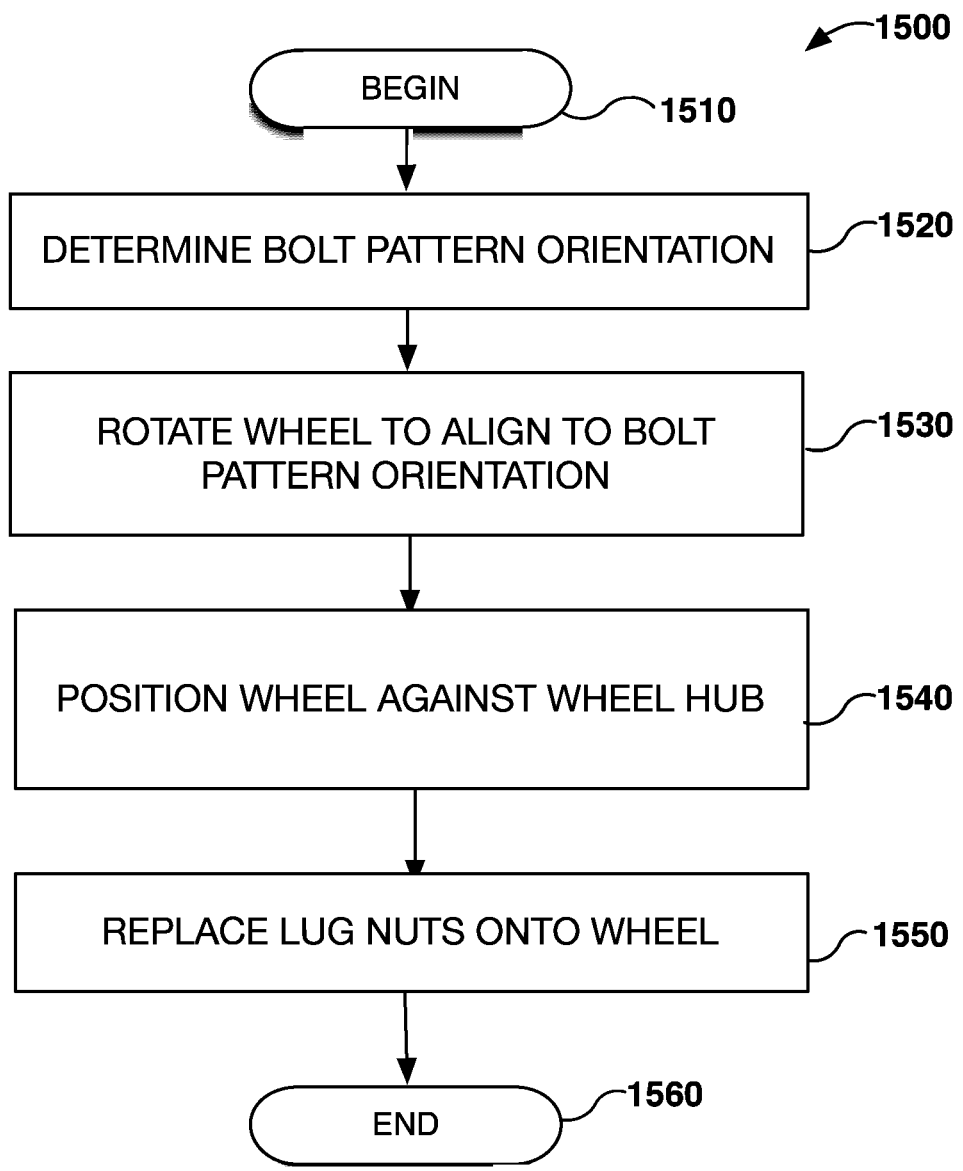
FIG. 15 illustrates an example method for automated wheel replacement.

As described in FIG. 7, the system 100 may include module 752 for performing operations of mounting a wheel. FIG. 15 illustrates a method 1500 for mounting a wheel onto a wheel hub. The system 100 begins (block 1510) determines a bolt pattern orientation of a wheel hub (block 1520). The system rotates a wheel held by a gripping device of the robotic apparatus (block 1530). The system 100 directs the robotic apparatus 150 to place the wheel against the wheel hub (block 1540). The system 100 directs the robotic apparatus to replace lug nuts onto the wheel (block 1550) and then the method ends (block 1560).

After a new tire has been placed onto a wheel and the wheel balanced, the system 100 may receive an indication from the wheel balancing machine, or from a user interface of the system 100, that the wheel is ready for placement back onto the vehicle.

The system 100 may keep track of the wheel position from where the wheel was removed. For example, the wheel may have been removed from the right front, the right rear, the left front or the left rear. Additionally, the user interface may receive an input as to what side of the vehicle the wheel should be mounted, for example left front, left rear, right front or right rear.

In response to receipt of the wheel readiness indication from the wheel balancing machine, and/or the received location of where the wheel should be mounted via the user interface, the system 100 initiates the robotic apparatus 150 to pick up the wheel with the tire gripper, and mount the wheel to the designated location.

When the robotic apparatus 150 picks up the wheel for remounting, the robotic apparatus may detect the orientation of the bolt holes of the wheel. The robotic apparatus may detect the bolt holes through sensors, and/or attached digital camera where images of the wheel are taken by the system 100, and the geometry of the wheel is determined. The system 100 may register the circumferential location of where the wheel is picked up by the tire gripper. In other words, the system would know the geometry of the wheel, and where the robotic arm has gripped the wheel.

In addition to detecting the wheel geometry, the system 100 may identify the rotational direction of the tire mounted on the wheel. Certain tires have a rotational direction that requires the wheel to be mounted on a left or right side of the vehicle, such that the tire rotates in the direction of the arrow. The system 100 may detect in an image, a rotational indicator, such as an arrow shown on the sidewall of the tire, or some fiducial marker, such as a sticker of some shape, color or printed pattern. Based on the rotational indicator, the system 100 would only mount the wheel on to the correct side of the vehicle such that the wheel, once mounted rotates in the indicated direction of the arrow.

Additionally, a user interface of the system 100 may receive an input designating the rotation direction for a wheel that is ready to be mounted to the vehicle. The system 100 would only mount the wheel on a side of the vehicle where the wheel would rotate in the designated rotational direction once mounted.

The robotic apparatus 150 may detect the orientation of the bolts of the wheel hub, and axially rotate the wheel to align the bolt holes of the wheel with the bolts of the wheel hub. The robotic apparatus may detect the orientation of the bolts through sensors, and/or attached digital camera where images of the wheel hub are taken by the system 100, and the geometry of the wheel hub is determined.

As the system 100, knows the wheel hub geometry and the wheel geometry, the robotic apparatus 150 may axially rotate, shift and/or position the wheel to align the wheel holes of the wheel to the bolts of the wheel hub. The system 100 may direct the robotic apparatus 150 to make slight correction movements to move the wheel in any direction while mounting the wheel against the wheel hub.

The robotic apparatus 150 seats the wheel against the wheel hub. Once the wheel is seated against the wheel hub, the robotic apparatus begins placing the lug nuts back onto the wheel.

The robotic arm picks up a lug nut from its respective bin, or other holding location of the lug nut. As indicated previously, the lug nut may be associated with a particular lug nut position. In one example, the lug nut may then may be placed onto the corresponding bolt from which it was removed. In another example, the lug nut may be placed onto any one of the lug nut bolts.

In one embodiment, the lug nuts are placed onto the wheel hub in a sequentially alternating pattern. Each of the bolts are torqued to a first torque value, for example 33.90 Nm (25 ft-lbs) to set the wheel in place against the wheel hub, or rotor. Then the robotic apparatus 150 arm moves to each lug nut, and then sequentially tightens each lug nut to a desired final torque value, for example 90 ft-lbs.

The robotic apparatus 150 arm may be fitted with a multi-socket head torque wrench, such as 2, 3, 4, 5, 6 or 8 socket head. In this case, the wheel lug nuts may be placed onto the bolts in a parallel, or simultaneous fashion. With this configuration, the lug nuts may all be torqued together to the final torque value. Multiple lug nuts may be held by the robotic apparatus 150, and then concurrently replaced onto lug nut bolts. For example, the robotic apparatus 150 may be configured to concurrently torque multiple lug nuts. The robotic apparatus 150 could replace all of the lug nuts at the same time. If the bolt pattern is a 4, 6 or 8 bolt pattern, a 2-socket head torque wrench could replace two lug nuts at opposing lug nut bolts, and the robotic apparatus 150 could rotate the 2-socket head torque wrench to replace the next set of lug nuts at opposing lug nut bolts. For a 5 bolt pattern, the 2-socket head torque wrench may apply the lug nuts using just one of the torque wrenches.

The robotic apparatus 150 begins rotation of a lug nut with a socket in a clockwise manner to replace the lug nut. The robotic apparatus 150 may include a torque sensor to receive a torque value for the torque applied to the lug nut. The system 100 monitors the torque value to determine if the torque value remains within a threshold torque value range. If the torque value exceeds the torque value range, then possibly the lug nut is being cross-threaded onto the wheel hub bolt. The robotic apparatus 150 may cease the operation if the threshold torque value range is exceeded. The system 100 may then generate an exception message for review by an operator via a user interface of the system 100. The message may indicate that a manual inspection of the bolt be performed.

After a wheel has been mounted, the robotic apparatus 150 may obtain an image of the wheel. The system 100 may store the image in the database 112, and associate the image with the tire change job.

Once all of the wheels are mounted back onto the vehicle, the system 100 will determine a job completion status. The job completion status may be initiated by the system 100 when robotic apparatus has mounted each wheel to the vehicle, and replaced the lug nuts. Additionally, a user interface input may allow a user to set a status that the tire change job has been completed. In response to the job completion status, the system 100 instructs the vehicle lifting device 140 to lower the vehicle to the ground. As a safety precaution, while lowering the vehicle to the ground, the vehicle lifting device 140 may scan using distance sensors, the area below the vehicle, and/or around the vehicle lifting device to determine if any obstructions are detected. If an obstruction is detected, then the system 100 causes the vehicle lifting device to cease lowering the vehicle, and an error condition identifying the problem may be presented to a user interface of the system 100. For example, the vehicle lifting device 140 may use proximity sensors, LiDAR, computer vision to detect the proximity of objects that may be near the vehicle lifting device.

Vehicle Lifting Device

Figure 16:
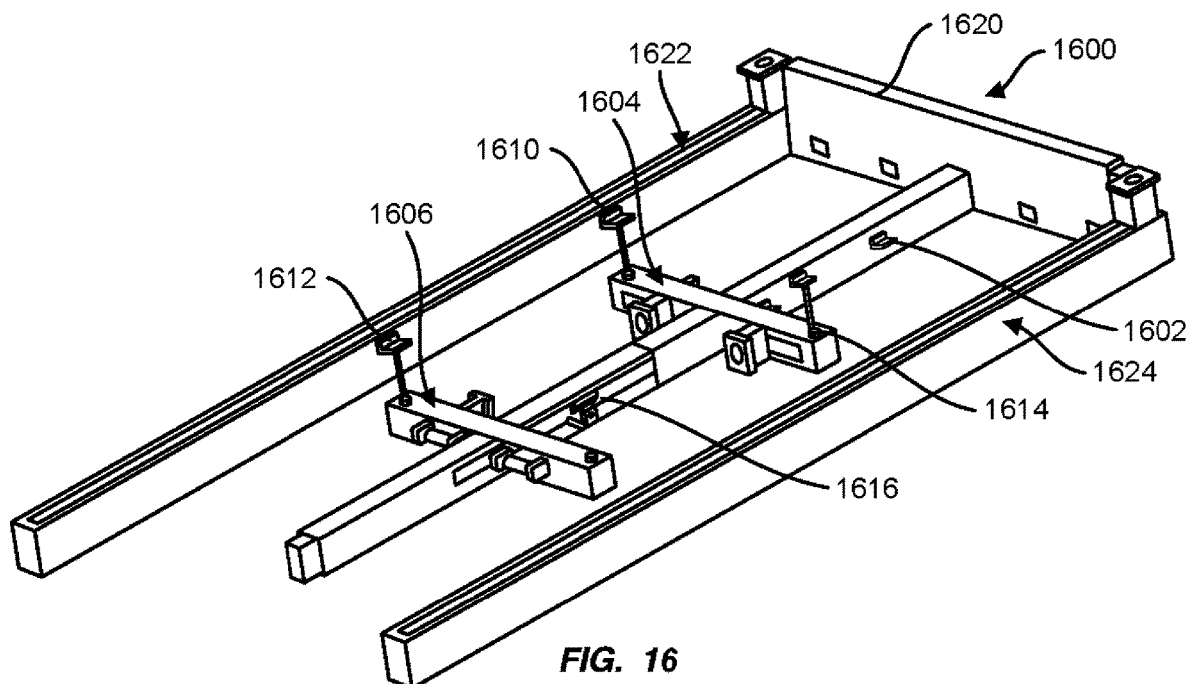
FIG. 16 illustrates a schematic drawing of an example of a vehicle lifting device.

Different embodiments of vehicle lifting devices are now disclosed. Referring to FIG. 16, one embodiment of an example vehicle lifting device 1600 is disclosed. The vehicle lifting device 1600 (referred to in FIG. 1 as 140) is comprised of one main center beam 1602 with independent lifting arm (either two or four) with lifting jacks 1610, 1612, 1614, 1616 (for example, pneumatic, hydraulic, or electric actuated jacks). At the front of the lift is a sensing system (2-dimensional or 3-dimensional vision, LiDAR, vision sensors) that may be used to detect or confirm wheelbase dimension or determine vehicle orientation and adjust the main center beam to the center of the vehicle (either by pneumatic, hydraulic, rack & pinion or linear screws). Once the vehicle lifting device 1600 is aligned, a message is sent to a user interface of the system 100 where the message indicates to move the vehicle into position over the vehicle lifting device 1600, or the vehicle lifting device 1600 may move under the vehicle. Another sensing system may be positioned to observe at the undercarriage of the vehicle to locate or confirm lifting points. Then the lifting arm may extend and move to the appreciate position. The lifting jacks 1610, 1612, 1614, 1616 may engage with the vehicle and a force feedback system coupled to the vehicle lifting device 1600 may detect if a jack is engaged. If the feedback system does not detect engagement of the lifting jack 1610, 1612, 1614, 1616, that vehicle lifting device 1600 may adjust a lifting jack 1610, 1612, 1614, 1616 height position, and then may lower the lifting jack 1610, 1612, 1614, 1616 and try a new position.

The automated vehicle lifting device 1600 may automatically lift a vehicle via two methods. In a first method, a vehicle is driven and positioned in front of the vehicle lifting device 1600, then the vehicle lifting device 1600 extends under the vehicle, positions the lifting jacks 1610, 1612, 1614, 1616, lifts the vehicle then retracts on to itself. Once work has been completed on the vehicle, the system 100 extends the vehicle lifting device 1600, and lowers the vehicle, and then the vehicle lifting device 1600 retracts.

In a second method, a vehicle is driven over the vehicle lifting device 1600 to a designated point, then the system 100 detects the vehicle lift points (e.g., the vehicle lifting locations), and then then lifts the vehicle. Once work has been completed, the vehicle is lowered by the system 100 and the vehicle is driven from the vehicle lifting device 1600.

The vehicle lifting device 1600 contains an adjustment mechanism that includes a front face beam 1620, a first stationary arm 1622, and a second stationary arm 1624 to extend and retract along the outside of the vehicle lifting device 1600. A center-beam 1602 has four moveable lifting jacks 1610, 1612, 1614, 1616 mounted on two actuating beams with two vision systems. A front face beam 1620 is moveably coupled to stationary arms 1622, 1624. The center-beam 1602 is fixed to the front face beam 1620. The adjustment mechanism 1620, 1622, 1624 may be extended or retracted in length by the system 100 to extend or retract to various positions depending on the vehicle's length. The vehicle length is communicated to the vehicle lifting device 1600 from the system 100.

A center-beam 1602 is connected to two cross-beams 1604, 1606 that are set perpendicular to the center-beam 1602. The center-beam 1602 and two cross-beams 1604, 1604 may have various numbers of rollers attached a bottom surface to help the center-beam 1602 and cross-beams 1604, 1604 move over the ground. The actuating mechanisms to position the center beam, and/or the lifting jacks 1610, 1612, 1614, 1616 may be of any actuating type, such as rack & pinion system, linear lead screw, pneumatic linear actuator.

The system 100 may maneuver the two cross-beam up and down the cross-beam depending on the vehicles lift points. At the end of each cross-beam is a lifting jack (either hydraulic, pneumatic or electric) that is extended or retracted out depending on the vehicle. That actuating mechanism is either a rack & pinion system, linear lead screw, pneumatic linear actuator. The lifting jack 1610, 1612, 1614, 1616 is equipped with a rubber pad on the top to minimize damage to the vehicle frame.

One vision system mounted at the front face of the center beam 1602 is to identify/detect the wheelbase dimension of the vehicle and the other mounted in the center of the center beam 1602 to identify/detect the hard or soft lift point on a vehicle frame. The lift points of the vehicle and wheelbase dimension can be entered into the system 100 via prior information (scanning the VIN, scanning the license plate, from the customer's input during scheduling or can be manually entered and received by the system 100 via a user interface).

Each jack 1610, 1612, 1614, 1616 is equipped with sensors (load, pressure, vision or laser) to detect if the vehicle shifts or if any added pressure/weight is placed on the vehicle while being lifted to prevent the vehicle from falling off. If the system 100 detects one of the jacks 1610, 1612, 1614, 1616 being disturbed, the system will cause the jacks to compensate for the jack being disturbed. Since each jack 1610, 1612, 1614, 1616 can sense the weight of the vehicle it can compensate the vehicle is unbalanced to ensure that the vehicle is lifted parallel to the ground.

A cleaning apparatus may be added to lift to ensure lifting points are clearly visible. A call back system may be implemented to confirm lifting point when sensing system can't determine lifting points. Different lifting pads may be added to the jacks depending on the vehicle type which will be determined by customer input data.

The vehicle lifting device 1600 may obtain imagery or other sensor data that may be stored by the system 100 in a database 112. The system 100 for example may determine alignment of the suspension of the vehicle. The determined alignment of the suspension of the vehicle may be reported via a user interface or a generated report identifying the alignment values for the vehicle.

Figure 17:
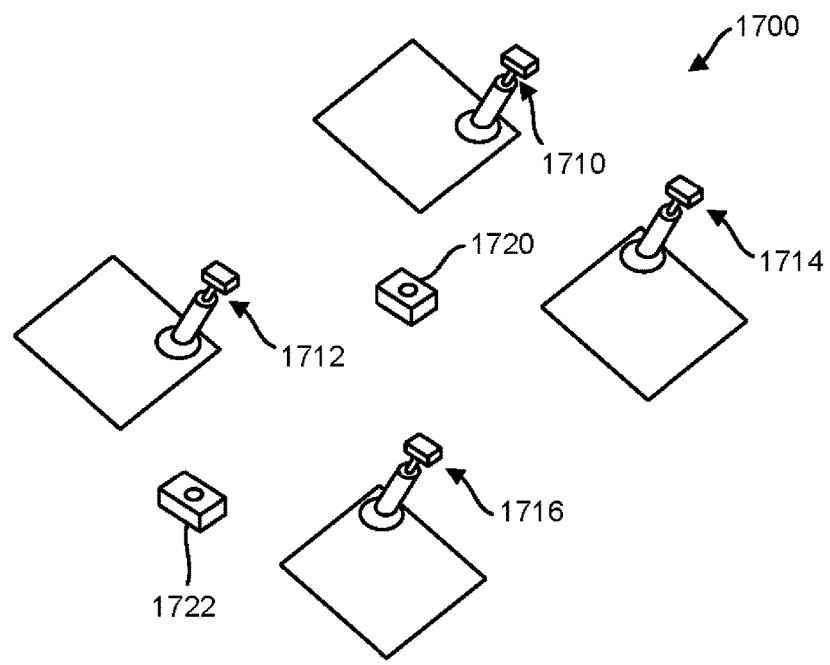
FIG. 17 illustrates a schematic drawing of an example of a vehicle lifting device.

Referring to FIG. 17, another embodiment of an example vehicle lifting device 1700 (referred to in FIG. 1 as 140) is disclosed. An automated vehicle lifting device 1700 may be comprised of lifting jacks 1710, 1712, 1714, 1716 (and may be actuated for example by pneumatic, hydraulic, electric, rack & pinion or linear screws) that are perpendicular to the vehicle. These lifting jacks 1710, 1712, 1714, 1716 may be placed in the ground or above ground. A vehicle may be parked in a designated spot above the lifting jacks 1710, 1712, 1714, 1716. A sensing system may be positioned to look at the bottom of the vehicle to locate or confirm lifting points of the vehicle. These lifting jacks 1710, 1712, 1714, 1716 extend or retract to accommodate the width of the vehicle and adjust their position to the lifting points of the vehicle or predetermined position for that specific vehicle.

As shown in the example, the vehicle lifting device 1700 is mounted in-ground and has four independent lifting jacks 1710, 1712, 1714, 1716 that may maneuver in three degrees of freedom (x,y,z). A vehicle is driven over the vehicle lifting device 1700 to a designated point or at any position over the lifting jacks 1710, 1712, 1714, 1716, and then the system 100 detects the lift points of the vehicle via a camera 1720 mounted on floor in a center of the vehicle lifting device 1700. There is another vision system 1722 mounted in front of the vehicle lifting device 1700 that provides direction by the system 100 for positioning the vehicle (for example, either by projecting laser beam on the vehicle for a live feed of a 2D/3D model moving into the vehicle lifting device 1700), or then lifts the vehicle. Once work has been completed, the vehicle is lowered and the vehicle is driven away from the vehicle lifting device 1700. The lifting jacks 1710, 1712, 1714, 1716 (either hydraulic, pneumatic or electric) move within their designated pads (x or y) depending on the vehicle. That actuating mechanism is either a rack & pinion system, linear lead screw, pneumatic linear actuator. The lifting jack 1710, 1712, 1714, 1716 may be equipped with a rubber pad on the top of the lifting jack 1710, 1712, 1714, 1716 to minimize damage to the vehicle frame.

Each lifting jack 1710, 1712, 1714, 1716 may be equipped with sensors (load, pressure, vision or laser) to detect if the vehicle shifts or if any added pressure/weight is placed on the vehicle while being lifted to prevent the vehicle from falling off. If the system 100 detects one of the lifting jacks 1710, 1712, 1714, 1716 being disturbed, the system will maneuver the other lifting jacks 1710, 1712, 1714, 1716 to compensate. Since each lifting jack 1710, 1712, 1714, 1716 can sense the weight of the vehicle the system 100 can compensate if a vehicle is unbalanced to ensure it is lifted parallel to the ground.

All vehicle information may either be sent to the vehicle lifting device 1700 prior (such as scanning the VIN, scanning the license plate, from the customer's input during scheduling) to the vehicle maneuvering over the vehicle lifting device 1700 or manually entered via a user interface of the system 100 prior to a vehicle being driving over the vehicle lifting device 1700.

The lifting bars may have a soft pliable material, integrally connected, and/or placed on top of them to prevent damage to the underside of the vehicle.

Figure 18:
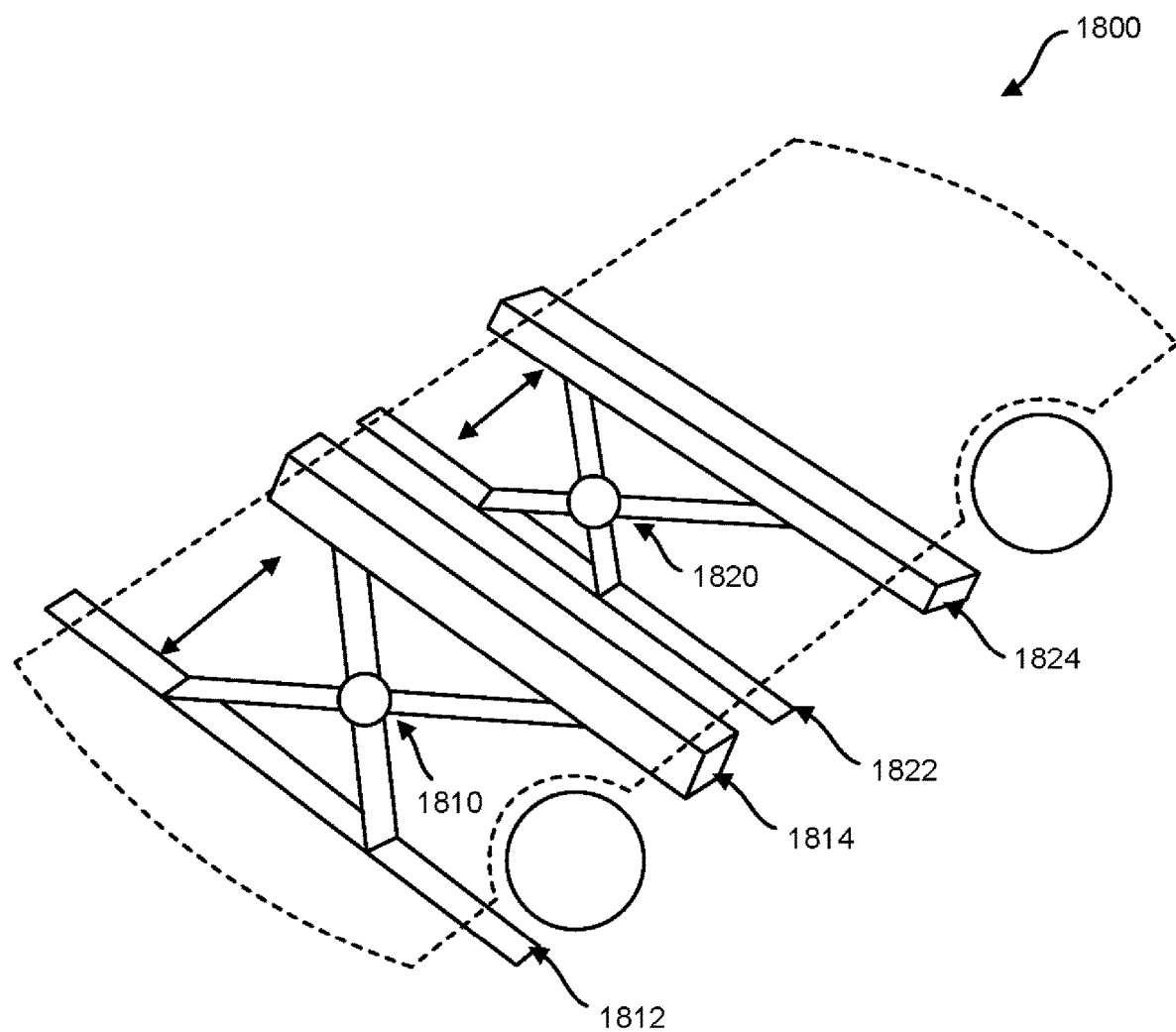
FIG. 18 illustrates a schematic drawing of an example of a vehicle lifting device.

Referring to FIG. 18, another embodiment of an example vehicle lifting device 1800 is disclosed. In another embodiment, an automated vehicle lifting device 1800 (referred to in FIG. 1 as 140) may be comprised of two independent jacks that adjusts to the lift points via a sensing system. These jacks may be placed in the ground or above ground.

This automated vehicle lifting device 1800 is designed to mounted in-ground or above ground and has two lifting jacks 1810, 1820 that are perpendicular to the vehicle. The lifting jacks 1810, 1820 span the width of various vehicles. Each lifting jack 1810, 1820 may expand or contract along the length of the vehicle depending on the vehicle lifting points.

When a vehicle is driven over the vehicle lifting device 1800 to a designated point or at any position over the lifting pads then the system 100 detects the lift points of the vehicle via a camera mount in the floor in the center of the system. There is another vision system mounted in front of the system that provides direction for positioning the vehicle (either by projecting lasers beam on the vehicle for, a live feed of a 2D/3D model moving over the vehicle lifting device 1800), or then lifts the vehicle. Once work has been completed, the vehicle is lowered and then the vehicle is moved away from the vehicle lifting device 1800. The lifting jacks 1810, 1820 (either hydraulic, pneumatic or electric) move within their designated pads (x or y) depending on the vehicle. That actuating mechanism for the lifting jacks 1810, 1820 may be of various types, such as rack & pinion system, linear lead screw, or a pneumatic linear actuator. The lifting jacks 1810, 1820 are equipped with a rubber pad on a top surface of that comes into contact with a vehicle to minimize damage to the vehicle frame/components.

All vehicle information may either be sent to the vehicle lifting device 1800 prior (such as scanning the VIN, scanning the license plate, from the customer's input during scheduling) to the vehicle maneuvering over the vehicle lifting device 1800 or manually entered via a user interface of the system 100 prior to a vehicle being driving over the vehicle lifting device 1800. The vehicle lifting device 1800 is in electronic communication with the system 100. The vehicle lifting device may receive instructions, commands and data from the system 100. Likewise, the vehicle lifting device may send data, and other information to the system 100. The vehicle lifting device may include different types of sensors for the inspection of the undercarriage of a vehicle, and/or for determination of vehicle lifting points. These sensors may include proximity sensors, video or still image cameras, LiDAR, thermal sensors, lighting, pressure sensors, and any combination thereof. The vehicle lifting device may obtain sensor data describing the undercarriage of a vehicle. For example, the sensors may obtain image information of the undercarriage of the vehicle. Using object identification techniques, the system 100 may then determine lifting point of the vehicle. Arms of the vehicle lifting device may then be positioned to the desired lifting points. The sensor information obtained by the vehicle lifting device may be stored by the system 100 and associated with the particular vehicle in a database.

Robotic Apparatus

Figure 19:
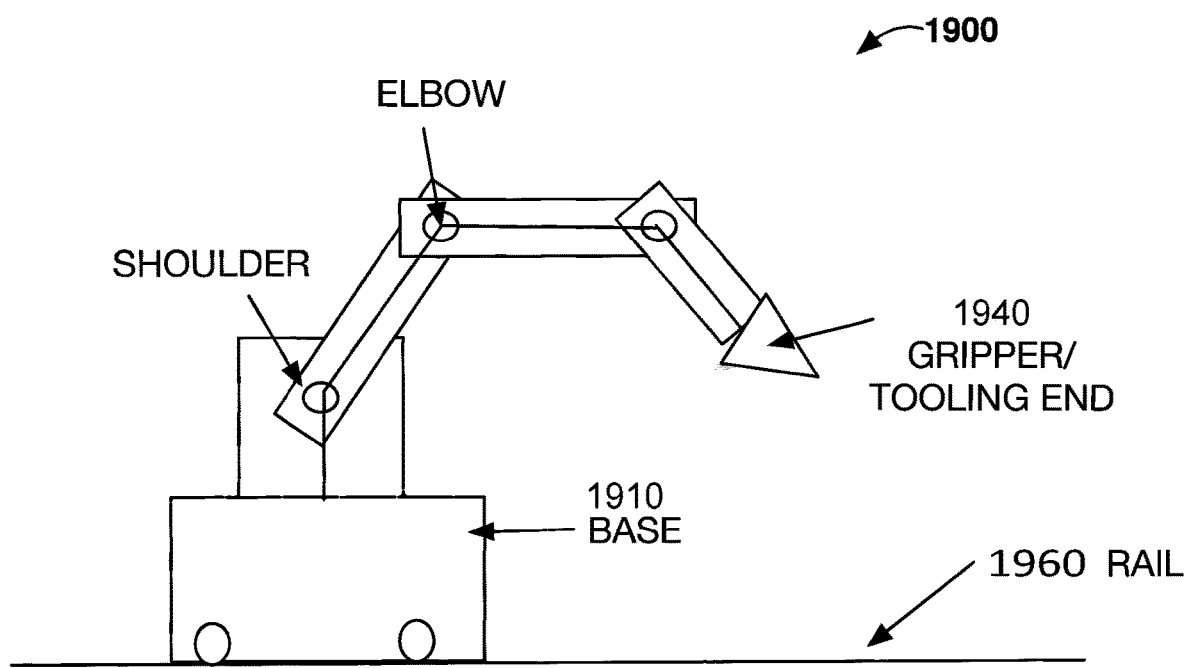
FIG. 19 illustrates a schematic drawing of an example robotic apparatus.

Referring to FIG. 19, an exemplary robotic apparatus 1900 for wheel removal and replacement is disclosed. The robotic apparatus is generally referred to in FIG. 1 as 150. The robotic apparatus 1900 is in electronic communication with the system 100. The robotic apparatus 1900 may receive instructions, commands and data from the system 100. Likewise, the robotic apparatus may send data, and other information to the system 100.

In some embodiments, the robotic apparatus has control circuitry, processors, and data storage. While the disclosure discusses operable communication with the system 100, the robotic apparatus may perform the methods described herein without interaction with the system 100. For example, the robotic apparatus may have one or more processing units that may perform wheel remove and replacement without interaction with the system. The robotic apparatus may be programmed and configured to perform operations in a stand-alone manner. A complete or partial copy of data from the database 112 may be locally stored in the robotic apparatus 150 data storage.

The robotic apparatus may include different types of sensors for the inspection of a vehicle's wheel, these may include proximity sensors, video or still image cameras, LiDAR, thermal sensors, lighting, pressure sensors, and any combination thereof. These sensors may be arranged in various configurations. The robotic apparatus may obtain sensor data describing the wheel of a vehicle. For example, the sensors may obtain image information for a wheel, and the system 100 may analyze the image to determine orientation of the lug nuts, to determine physical geometry of the wheel, and to determine other aspects of the wheel. The sensor information obtained by the robotic apparatus 150 may be stored by the system 100 and may be associated with the particular vehicle and/or tire change job.

In one example, the robotic apparatus 1900 is a 6-axis robot, or articulated robot, that allows articulated and interpolated movement to any point within a working envelope. At axis 1, the robot rotates the base 1910 of the robot. At axis 2, the robot extends forward and backward the robot's lower arm. At axis 3, the robot raises and lowers the robot's upper arm. At axis 4, the robot's upper arm can wrist roll. At axis 5, the robot's lowers wrist of the robot's arm. At axis 6, the robot rotates wrist of the arm. The arm may have a tooling end 1940 with sensors, a torque wrench, and/or other devices attached.

The robotic apparatus 150 may include proximity sensors to detect objects within a working envelope, or within a threshold distance, of the robotic apparatus 150. The working envelope is a physical volume of space of movement and/or operation of the robotic apparatus 150. For example, a sensor may detect movement of a person that walks near or into the working envelope of the robotic apparatus 150. The system 100 may determine that the detected object is with a certain distance of the robotic apparatus 150. If the detected object is determined to be within a threshold distance of the robotic apparatus or the working envelope, then the system 100 may direct the robotic apparatus to cease movement and/or other operations. The system 100 may generate an error condition, and display the error condition to a user interface of the system 100. In one example, the robotic apparatus 150 may automatically resume operation once the system 100 determines that the detected object is no longer within the working envelope, or the within the threshold distance of the robotic apparatus 150. In another example, to resume operations, the user interface receives an input to resume operations. In response to the received input, the robotic apparatus 150 resumes operation.

Additionally, proximity sensors may be placed in a working environment, such as a vehicle bay, and the proximity sensors are communicatively coupled to the system 100. Similar to the discussion above, the system 100 may receive sensor data from the proximity sensors and detect an object within a working space, the system 100 may in response to detecting the object, cause one or more robotic apparatus 150 to cease operations when the object moves into the working environment.

Robotic Apparatus Placement. The number of robotic apparatus 150 may be positioned in different locations for operation and access to vehicle wheels. The following illustrates exemplary placement of a robotic apparatus and is not meant to be limiting. For example, one robotic apparatus may be positioned at two locations for access to a left and right side of a vehicle. The robotic apparatus may include a multipurpose tool for tire and lug nut removal. The robotic apparatus 150 may be affixed to a rail 1960 thereby allowing linear movement of the robotic apparatus along the rail.

In another example, two robotic apparatus 150 may be attached to a guide of rail 1960. In this configuration, one of the robotic apparatus is tooled for lug nut removal, and the other for wheel removal. The robotic apparatus may move in a linear fashion to access the front and rear wheel on a particular side of the vehicle.

In another example, four robotic apparatus 150 may be positioned with two robotic apparatus on each side of a vehicle. One robotic apparatus may be configured for lug nut removal and another for wheel removal.

A robotic apparatus may be located in a position where the robotic apparatus 150 may be able to perform operations on two vehicles. The ability of a robotic apparatus 150 to interleave work between two vehicles is discussed further below in the section on tire change job coordination. The system 100 may execute tire change job operations on two vehicles. For example, the system may instruct a particular robotic apparatus 150 to perform a wheel removal operation for a first vehicle. The robotic apparatus after taking off the wheel, may the hand the wheel off for further procession. After handing off the wheel, the system may direct the robotic apparatus to rotate toward a second vehicle. The system 100 may instruct the robotic apparatus 150 to perform a wheel replacement operation for the second vehicle. The robotic apparatus 150 may pick up a wheel that was previously taken off of the second vehicle. The robotic apparatus then may perform a tire replacement of the wheel onto the second vehicle. In other words, a particular robotic apparatus may perform operations on one vehicle in one bay, and then turn or rotate the robotic apparatus 150 to perform operations on a second vehicle in a second bay.

Robotic Tooling Head. The robotic apparatus 1900 may include a multipurpose tool head 1940 that is equipped with a gripping mechanism, torque wrench and/or sensing system to detect or confirm lug nut position and lug nut type. The tool head 1940 is configured to remove the lug nuts thereby allowing removal of a wheel. The tool head 1940 may also replace lug nuts after the wheel is replaced onto a wheel hub. The tooling end of the robotic apparatus 150 may be configured to remove lug nuts for a 4-lug nut, 5-lug nut, 6-lug nut or 8-lug nut configuration. The tooling end may include multiple attachment ends for different socket configurations. In one embodiment, the tooling end includes a singular socket that is moved to each determined lug nut position. In another embodiment, the tooling end uses multiple sockets to concurrently remove or replace two or more lug nuts simultaneously.

In one example, the robotic apparatus 1900 may include two independent tool heads with a sensing system that will either grip the wheel for removal and install, or removal and install lug nuts.

A cleaning system may be added to the robotic apparatus 150 or as a stand-alone system to clean the wheel thereby providing a surface of the wheel and lug nuts for better visibility by a sensor of the robotic apparatus, such as a digital camera. The cleaning system may be controlled via the robotic apparatus via the system 100.

Tire Gripper

The robotic apparatus 150 may include one or more tire grippers that provide a mechanism to grab, hold, move, rotate, mount, and unmount a tire and wheel from a vehicle wheel hub. Some examples, include a tire gripper with a single torque wrench that maneuvers to various lug nut positions after gripping a tire. Another example, is a tire gripper with a single torque wrench wherein the robotic apparatus moves the torque wrench to different locations to remove lug nuts prior to gripping the tire. Another example is a tire gripper with two torque wrenches that adjust to lug nut positions after gripping the tire. Another example is a tire gripper with four torque wrenches arranged in a diamond pattern that can adjust spacing depending on a lug nut pattern width.

The robotic apparatus 150 may selectively choose a tool head depending on the vehicle. For example, the robotic apparatus may be configured to selectively change from a four, five or six torque wrench pattern depending on the determined lug nut pattern of the vehicle.

Figure 20:
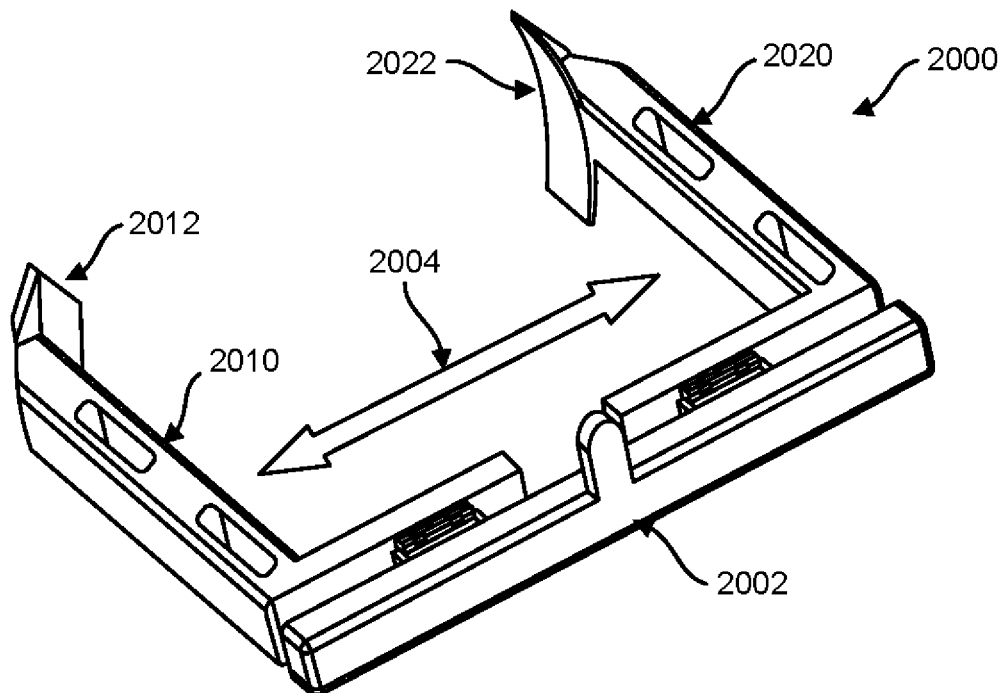
FIG. 20 illustrates a schematic drawing of an example tire gripper.

FIG. 20 illustrates a schematic illustration of an example tire gripper 2000. In this example, the tire gripper 2000 includes either two, three or four fingers 2010, 2020 that grip a tire from the sides (tread of the tire). The operation of the tire gripper 2000 may be pneumatically, hydraulically, magnetically, electrically (or a combination thereof) controlled via the robotic apparatus 150.

The tire gripper 2000 may grip the outside of the diameter of the tire via two or multiple fingers 2010, 2020 which are moveably coupled to a beam 2002. The beam may be connected to the robotic apparatus 150. The fingers 2010, 2020 move forward and away from one another as indicated by the arrow 2004. The diameter of the tire to be gripped by the tire gripper 2000 is either identified by a vision system mounted on the tire gripper 2000 and a library of wheel and/or tire sizes or determined via the same vision system. Depending on the diameter of the tire, the robotic apparatus 150 will maneuver the fingers 2010, 2020 of tire gripper 2000 to an appropriate position radially around the tire and at a particular distance from the surface of the tire. Then the system 100 will cause the fingers 2010, 2020 to move together in order to grip the tire. At the end of each finger 2010, 20220 is a curved pad 2012, 2022 that is either interchangeable depending on the wheel size or fixed one size fits all. The interchangeable pads 2012, 2022 are either manually changed prior to the vehicle being serviced or automatically via a tool change mechanism by the robotic apparatus. The fingers 2010, 2020 are actuated via pneumatic or electric linear actuator or lead screws once the robot positions the tire gripper 200. Each finger 2010, 2020 is equipped with sensors (pressure, proximity, photoelectric, distance or fiber-optics) to detect that the tire gripper 2000 has made contact with the tire, and that the tire has been gripped and remains gripped while the robotic apparatus 150 is pulling the wheel off of the vehicle.

Figure 21:
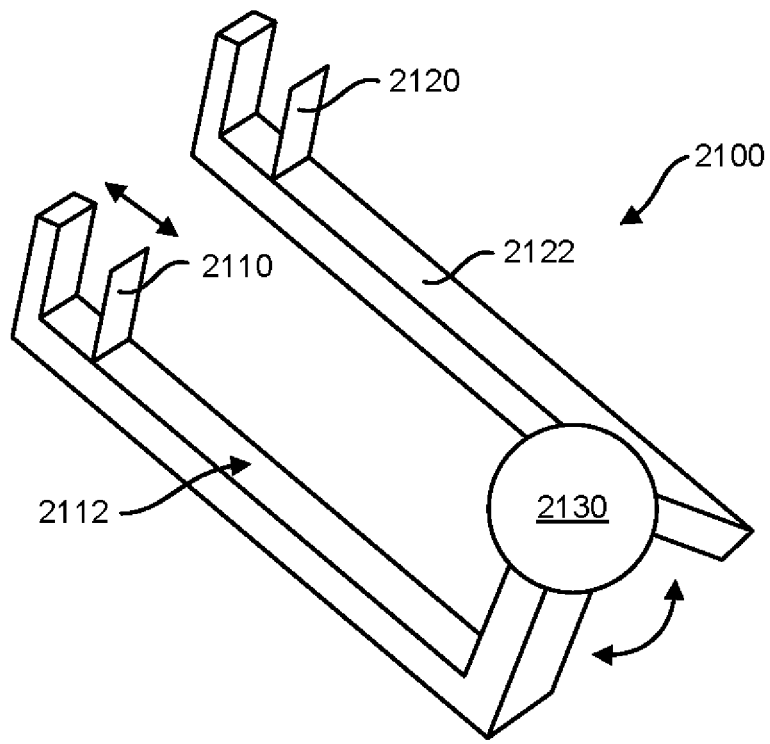
FIG. 21 illustrates a schematic drawing of an example tire gripper.

FIG. 21 illustrates a schematic illustration of an example tire gripper. In this example, the tire gripper 2100 includes either 2, 3 or 4 fingers 2112, 2122 that are equipped with adjustable grippers 2110, 2120 that grip width of the tire. These fingers can be equipped with rollers to rotate the tire for placement adjustment. The operation of the tire gripper may be pneumatically, hydraulically, magnetically, electrically (or a combination thereof) controlled via the robotic apparatus.

This tire gripper 2100 may grip the width of the tire via two or multiple fingers. The width is either identified by a vision system mounted on the tire gripper 2100 and a library of wheel sizes or determined via the same vision system. At the end of each finger 2112, 2122 is a gripping mechanism 2110, 2120 that expands or contracts to grip the tire. This mechanism is equipped with sensors (pressure, proximity, photoelectric, distance or fiber-optics) to detect that the tire gripper 2100 has made contact, gripped and remains gripped while the robotic apparatus moves the wheel. The tire gripper 2100 is actuated via pneumatic or electric linear actuator or lead screws. Each finger is mounted to a center plate 2130 that moves the fingers 2112, 2122 radially to accommodate various diameters of tires. The system 100 via the vision system may determine the tire's outside diameter and position relative to the car for the robotic apparatus 150 to position the tire gripper 2100.

Figure 22:
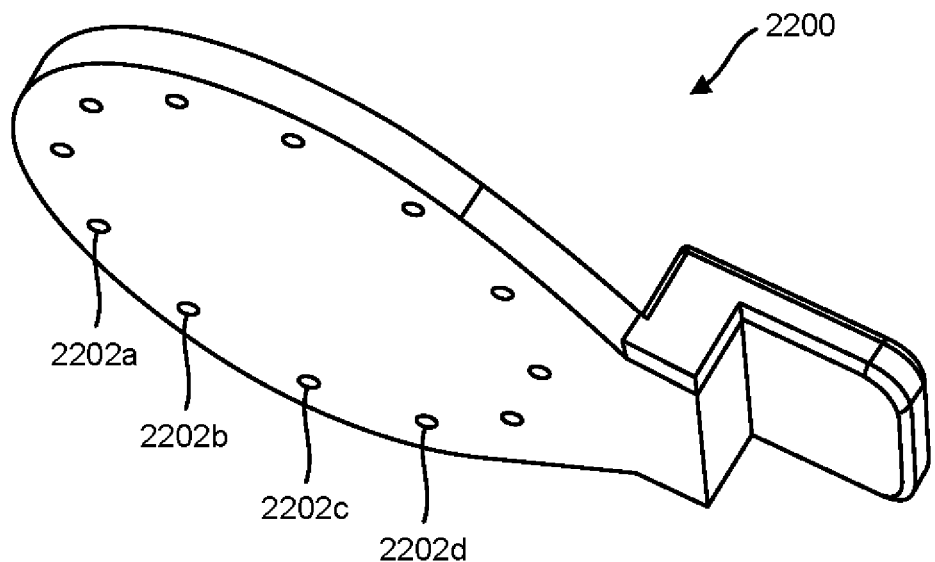
FIG. 22 illustrates a schematic drawing of an example vacuum grip plate.

FIG. 22 illustrates a schematic illustration of an example vacuum grip plate. The vacuum grip plate 2200 grips a portion of the tire wall, or wheel rim. The operation of the tire plate may be actuated via the robotic apparatus.

The vacuum grip plate 2200 may grip the face of the tire via vacuum via ports on the vacuum grip plate 2200 as applied to the surface on the rubber tire. The grip plate 2200 defines various rings of multiple orifices or ports 2202a, 2202b, 2202c, 2202c, 2202d, etc. that are arranged in various diameters around grip plate. Each orifice 2202a, 2202b, 2202c, 2202c, 2202d, etc. is equipped with a sensor and valve to allow vacuum to the orifices that are in contact with the rubber. The same sensors will detect if the vacuum is lost while the gripper is in motion. A vision system mounted on the gripper identifies the outside diameter of the tire in relation to the rim to center the gripper over the center of the tire. The robotic apparatus 150 will place the grip plate against the side wall of the tire, and then the vacuum generator is turned by the system causing a suction or vacuum force to grip the tire.

Figure 23:
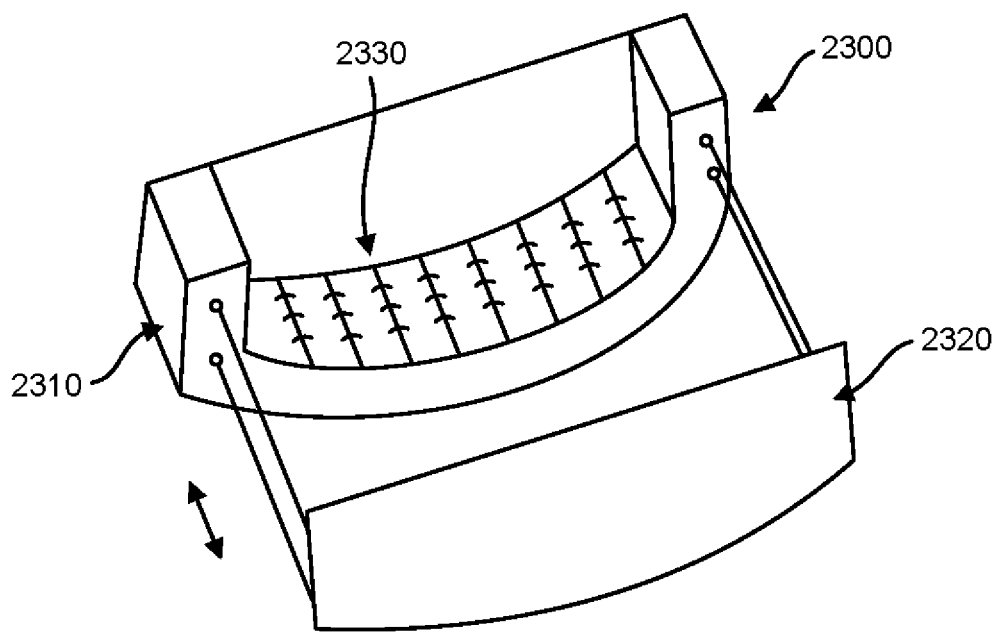
FIG. 23 illustrates a schematic drawing of an example mechanical tire basket.

FIG. 23 illustrates a schematic illustration of an example mechanical tire basket 2300. The mechanical tire basket 2300 includes circular basket that cups the bottom portion of the tire with adjustable side wall to grip the tire. The inside of the mechanical tire basket 2300 can be equipped with rollers to rotate the tire for placement adjustment.

The mechanical tire basket 2300 is configured to grip the width of the tire via a basket 2310 and clap 2320. The width of the tire is either identified by a vision system mounted on the mechanical tire basket 2300 and a library of wheel sizes or determined via the same vision system. The tire basket 2300 has rollers 2330 embedded in the bottom of the basket 2310 and a clap mechanism 2320 that extends or retracts to accommodate various tire widths. The clap plate 2320 may be actuated via pneumatic or electric linear actuator, lead screws or telescoping cylinders. Additionally, the clap plate 2320 may be equipped with sensors (pressure, proximity, photoelectric, distance or fiber-optics) to detect that the mechanical tire basket 2300 has made contact, gripped and remains gripped while the wheel is being maneuvered by the robotic apparatus 150. The rollers 2330 are configured to rotate the wheel while gripped to align the wheel to the mounting stud on the vehicle.

When a tire needs to be gripped, the vision systems detect the wheel in relation to the robotic apparatus 150 and the robotic apparatus moves the mechanical tire basket 2300 below the tire. The clap plate 2310 extends to a predetermined width for that specific tire (which is either known or determined by measuring the wheel width). The robotic apparatus 150 moves the mechanical tire basket 2300 on the underside of the tire and the clap plate 2320 grips the tire.

Computer Vision

The system 100 may include a computer vision module (756 as referenced in FIG. 7) that processes obtained images. As described herein, various components may use computer vision cameras, or other sensors to assist in the location determination of physical aspects of the vehicle, physical geometry of physical aspects of the wheels of the vehicles.

Figure 24:
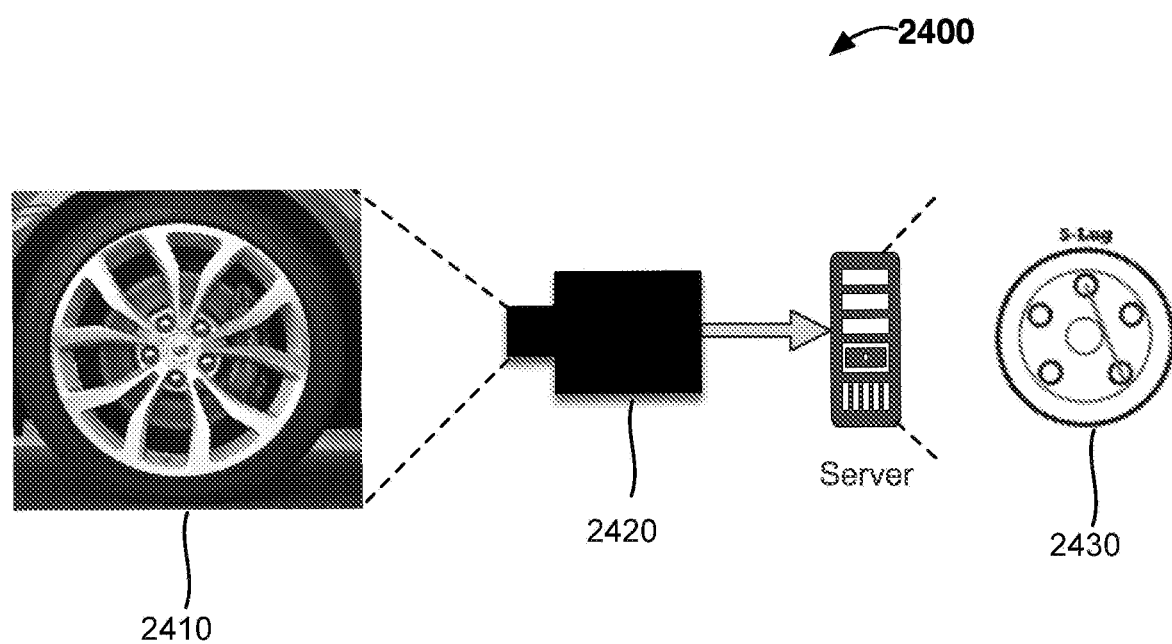
FIG. 24 illustrates a schematic illustration of obtaining an image and lug-pattern determination.

FIG. 24 illustrates a schematic illustration of an image capture system 2400 obtaining an image 2410 via a computer vision camera 2420 and lug-pattern determination 2430. The system 100 may determine the pattern of lug nut bolts, where there is a determined four bolt pattern 2510, a five bolt pattern 2520, a six bolt pattern 2530 and/or an eight bolt pattern 2540.

The system 100 may use a trained neural network to identify a lug nut pattern. For example, using machine learning training techniques, the system 100 may be trained with multiple images of a 4-pattern, 5-pattern, 6-pattern, or 8 pattern lug nut configurations. Using the trained model in a production mode, then the system 100 may identify a lug nut pattern from a received image as an input to the trained neural network.

In reference to FIG. 24, the system 100 obtains an image of a wheel. As discussed previously, the image may be obtained from different devices or computers of the system 100, for example a digital camera coupled to the robotic apparatus 150, or via a mobile device communicatively coupled to the system 100. The system 100 may process the obtained image via the trained neural network as a data input, and an image classifier may then determine the particular lug nut pattern type. The system 100 may then use the lug nut pattern type as discussed herein.

The system 100 may also use an image object detection process to identify the number of lug nuts of the wheel. For example, the system 100 may receive an image and detect the number of lug nut objects of a wheel depicted in the image. The system may identify the number of lug nuts, and set the lug nut pattern based on the number of lug nuts detected. For example, if the system 100 detects 4 lug nut objects in the image, then the system 100 may use a 4 lug nut pattern for lug nut removal for a wheel. If the system 100 detects a 5 lug nut objects in the image, then the system 100 may use a 5 lug nut pattern for lug nut removal for a wheel. Based on the position of the detected objects, the system may calculate a centroid or center of the objects by connecting a line between each of the lug nut objects, and determining an intersection point of the lines. The determined centroid of the wheel may be used to position the robotic apparatus for removal of the lug nuts from the wheel.

Additionally, fiducial markers may be placed on the vehicle to assist the system 100 for determining locations. As an example, stickers with certain patterns, colors, shapes, or a combination thereof, may be placed on the vehicle. In the context of the vehicle lifting process, these fiducial markers may be placed on lifting points under the vehicle which would assist the vehicle lifting device in locating the lifting contact points for the vehicle.

Additionally, fiducial markers may be placed on a wheel fastener to indicate a location of a lug nut. This may help the robotic apparatus 150 in determining one or more positions of lug nuts of the vehicle. Fiducial markers may be wireless devices that may be affixed to the vehicle. The wireless device may be for example a blue-tooth enabled socket that is placed onto the lug nut. The socket size of the blue-tooth enabled socket may be for example in the sizes of (SAE ¾ inch, ⅞ inch, ¹³⁄₁₆ inch; Metric 17 mm, 19 mm, 21 mm). Each of the wireless devices may emit a unique signal or signature that may be recognized by the system 100. Using multiple fiducial markers on the lug nuts the system 100 may determine the lug nut configuration of the wheel. The system 100 may detect the position of fiducial markers placed adjacently to one another, or placed across from one another, or placed on the second or third lug nut. The system 100 may then determine the center or centroid of two markers and calculate the distance between the markers. Additionally, the system 100 may determine the angle of two lines from a first fiducial marker and to a second fiducial marker, and then from the second fiducial marker to a third fiducial marker that have been placed on the lug nuts.

Based on the position of the lug nuts the system may determine the bolt pattern (for example the number of bolts and metric size in mm and/or imperial size in inches: 4-100, 4×3.94; 4-114.3, 4×4.5; 5-100, 5×3.94; 5-108, 5×4.25; 5-112, 5×4.41; 5-114.3, 5×4.5; 5-115, 5×4.52; 5-12, 5×4.72; 5-120.7, 5×4.75; 5-127, 5×5; 5-130, 5×5.12; 5-135, 5×5.3; 5-139.7, 5×5.5; 6-114.3, 6×4.5; 6-127, 6×5; 6-135, 6×5.3; 6-139.7, 6×5.5; 8-165.1, 8×6.5; 8-170, 8×6.69. The first number indicates how many lug nuts are on the wheel, and the second number describes the distance between two lug nuts. This is also referred to as the bold circle diameter, or the pitch circle diameter. While the foregoing discusses the system 100 using fiducial markers to determine a bolt pattern, the system 100 may also determine the bolt pattern using computer vision by obtaining imagery of the bolts on the wheel and using an object detection process to identify the centroid, or edge of the lug nuts. The number of bolts and the metric size in mm and/or imperial size may then be calculated by the system 100.

Referring to FIG. 25, four, five, six and eight bolt patterns are shown. The system using computer vision, fiducial makers, or other techniques described herein may determine the particular bolt pattern for the vehicle. The system 100 may then instruct the robotic apparatus accordingly to remove and/or replace lug nuts. In determining the particular size of the bolt pattern in the case of a vehicle with four lug nuts 2510, the system 100 may measure the center of two holes that are directly across from one another for example, lug nuts 2512, 2514. In determining the particular size of the bolt pattern in the case of a vehicle with five lug nuts 2520, the system 100 may measure from the center on one lug nut 2522 to the back of the third lug nut 2524. In determining the particular size of the bolt pattern in the case of a vehicle with six lug nuts 2530, the system 100 may measure the center of two holes that are directly across from one another for example, lug nuts 2532, 2534. In determining the particular size of the bolt pattern in the case of a vehicle with eight lug nuts 2540, the system 100 may measure the center of two holes that are directly across from one another for example, lug nuts 2542, 2544.

Moreover, the system 100 may identify the fiducial markers in an image taken by a camera, for example an image taken by a camera of the vehicle lifting device 140 or a camera of the robotic apparatus 150. The system 100 processes the image to detect objects in the image. Based on the detected object, the system 100 may identify the position of the marker. A fiducial maker may be associated with a particular meaning or action by the system 100. For example, based on a pattern or color of the marker, the system may identify the marker as lug nut location, a lifting point location, etc.

Vehicle Service Report, and Real-time Viewing. The system 100 may include a reporting module (758 as referenced in FIG. 7) that provides information related to the performance of the tire change job. Since the robotic apparatus 150 and the vehicle lifting device 140 may include video cameras, and other sensors, still and real-time imagery may be obtained during the lifting and wheel removal and replacement processes. The system 100 may be configured to stream the imagery obtained from a digital camera to a user interface of a mobile or web-based application thereby allowing a customer to view the maintenance of their vehicle. Additionally, the system may include a 2- or 3-dimensional model of their vehicle. The user interface may show the vehicle with tires being replaced indicative of the status of the overall tire change job.

The system may generate a vehicle service report identifying the vehicle details for a specific tire change job and may include one or more images that were obtained by the system during the vehicle check-in, vehicle lifting and/or wheel removal/replacement steps. The report may suggest additional corrective or maintenance actions to be performed, such as the vehicle needing brake replacement. The report and associated images may show that no damage occurred during tire replacement and installation.

Tire Rotation

While the above disclosure describes the system 100 being applied towards wheel removal for tire replacement, the system 100 may also be used for tire rotation. In this case, the robotic apparatus 150 removes on a first side of the vehicle, a first wheel from the vehicle as described above, and places the wheel and tire at a staging location. The robotic apparatus 150 removes on the first side of the vehicle, the second wheel from the vehicle and places the wheel and tire at a staging location. Either the same robotic apparatus 150, or another robotic apparatus, similarly removes the wheels from the other side of the vehicles. The system 100 then instructs the robotic apparatus 150 as to which location a wheel will be replaced. For example, various rotation patterns may be selected via a user interface, or be configured for a default rotational pattern. This rotational pattern may be associated with the drive type of vehicle being serviced, such as all-wheel drive, rear-wheel drive, or front-wheel drive. The following are some rotational patterns the system 100 may use:

Forward Cross (primarily for front-wheel drive vehicles). The system 100 directs the robotic apparatus 150 to move 1) the left front wheel to the left rear, 2) the left rear wheel to the right front, 3) the right front wheel to the right rear, and 4) the right rear wheel to the left front.

X-Pattern. The system 100 directs the robotic apparatus 150 to move 1) the left front wheel to the right rear, 2) the right rear wheel to the left front, 3) the right front wheel to the left rear, and 4) the left rear wheel to the right front.

Rearward Cross (primary pattern for rear and four-wheel drive vehicles). The system 100 directs the robotic apparatus 150 to move 1) the front left wheel to the right rear, 2) the right rear wheel to the right front, 3) the right front wheel to the left rear, and 4) the left rear wheel to the left front.

Same-side Pattern (pattern for vehicles with direction tires of the same size). The system 100 directs the robotic apparatus 150 to move 1) the front left wheel to the left rear, 2) the left rear wheel to the left front, 3) the right front wheel to the right rear, and 4) the right rear wheel to the right front.

Rotational Pattern (can be clockwise or counter-clockwise). The system 100 directs the robotic apparatus 150 to move 1) the front left wheel to the front right, 2) the front right wheel to the rear right, 3) the rear right wheel to the left rear, and 4) the left rear wheel to the front left.

While the rotational patterns above are described as beginning with a particular wheel, the system 100 may direct the robotic apparatus 150 to begin with any wheel and secure it to the desired wheel hub of the vehicle. The above patterns are meant to be exemplary, and not limiting.

Vehicle Interface The system 100 may be configured to receive vehicle computer information. For example, a wired or wireless monitor may be connected to a vehicle (for example, an OBD-II scanner), and information about the vehicle is retrieved and stored on the database 112. In other embodiments, vehicles may have a wireless interface directly with the vehicle's system, for example those found in self-driving or autonomous vehicles. The system 100 may establish a link with the wireless vehicle interface, and obtain information, and or provide information to the vehicle. For example, the vehicle may include preferred tire pressure settings. This information may be obtained and used during the tire inflation process described above.

Tire Change Job Coordination The system 100 may include a tire change job coordination module (754 as referenced in FIG. 7) that evaluates the time necessary to complete a tire change job. While the above disclosure describes the removal and replacement of wheel for a singular vehicle, the system 100 may also control a plurality of robotic apparatus 150 to coordinate removal and/or replacement of wheels for two or more vehicles. For example, two vehicles may be positioned in a first bay and a second bay. The vehicles are lifted to a desired height. The robotic apparatus 150 may interleave work to be performed on the first vehicle, and the second vehicle. For example, the robotic apparatus 150 may take off the front wheel of the first vehicle, and hand the wheel/tire off to a tire replacement machine, or a wheel staging location. For the second vehicle, a new tire may have already been replaced and the wheel is ready to be placed back on to the front wheel hub of the second vehicle. The robotic apparatus 150 may then pick up the wheel, and place it back onto the wheel hub of the second vehicle. Next, the robotic apparatus 150 may remove the rear wheel off the second vehicle, and hand it off to the tire replacement machine. The robotic apparatus 150 may then pick up the front wheel for the first vehicle, and secure it back on to the first vehicle front wheel hub.

As described the system 100 may interact with both vehicles and perform a wheel removal or replacement operation in a sequential manner for both vehicles. The system 100 may divide a tire change job into multiple segmented operations. The system may direct a single robotic apparatus 150 to perform one or more segmented operations for a first vehicle, and then one or more segmented operations for a second vehicle. The segmented operations may have an associated duration or estimated time needed by the system to complete the segmented operation. Examples of segmented operations that may be performed by the system 100 using the robotic apparatus 150 may include:

Operation 1: Obtain sensor data describing a wheel using sensors of the robotic apparatus.

Operation 2: Determine a lug nut pattern based on the sensor data obtained by the robotic apparatus.

Operation 3: Determine lug nut size based on the sensor data obtained by the robotic apparatus.

Operation 4: Determine fiducial markers placed on a wheel based on the sensor data obtained by the robotic apparatus.

Operation 5: Determine wheel geometry, a plane of a surface of wheel, and/or position of wheel in 3-dimensional space based on the sensor data obtained by the robotic apparatus.

Operation 6: Choose or select socket by the robotic apparatus for a determined lug nut size.

Operation 7: Direct a socket onto a lug nut of a wheel of a vehicle using the robotic apparatus.

Operation 8: Remove one or more lug nuts using the robotic apparatus by applying counterclockwise motion of the socket placed onto a lug nut.

Operation 9: Detect using sensors of the robotic apparatus, rotational torque values while removing a lug nut.

Operation 10: Place a removed lug nut into a receiving bin or staging location by the robotic apparatus.

Operation 11: Grip tire with tire gripper using the robotic apparatus.

Operation 12: Determine gripping pressure of the tire gripper using sensors of the robotic apparatus.

Operation 13: Remove a wheel from the wheel hub of the vehicle using the robotic apparatus.

Operation 14: Place removed wheel in a staging location or hand off wheel by the robotic apparatus to another device.

Operation 15: Retrieve the wheel from a staging location or from another device using the robotic apparatus.

Operation 16: Obtain sensor data describing a wheel using sensors of the robotic apparatus.

Operation 17: Determine a geometry and/or position of bolt holes of the wheel based on the sensor data obtained by the robotic apparatus.

Operation 18: Obtain sensor data describing a wheel hub using sensors of the robotic apparatus.

Operation 19: Determine wheel hub bolt orientation of vehicle based on the sensor data obtained by the robotic apparatus.

Operation 20: Orient or rotate the retrieved wheel using the robotic apparatus to align the bolt holes of the wheel with the wheel hub bolt orientation of the vehicle.

Operation 21: Place the wheel onto the wheel hub of the vehicle by the robotic apparatus.

Operation 22: Obtain from a predetermined location one or more lug nuts by the robotic apparatus.

Operation 23: Place the obtained lug nuts onto a hub bolt of the vehicle using the robotic apparatus.

Operation 24: Direct a socket onto lug nut of a wheel of a vehicle using the robotic apparatus.

Operation 25: Replace one or more lug nuts using the robotic apparatus by applying clockwise motion of a socket placed onto a lug nut.

Operation 26: Detect using sensors of the robotic apparatus, rotational torque value while placing a lug nut.

The operations described above are not meant to be limiting, but illustrative of operations that may be performed by the system 100. Some of the operations may not be performed, the order of the operations may be performed in a different order than listed above. The segmented operations may be performed by a single or multiple robotic apparatus 150. The robotic apparatus 150 may perform segmented operations on a first vehicle and on a second vehicle, thereby interleaving performance of discrete operations for each vehicle.

In one example, the segmented operations may be performed in the same order for the first and second vehicle, for example the system 100 may perform one or more of operations 1-14 on a first vehicle, and then perform one or more operations 1-14 on a second vehicle. The system 100 may then perform one or more operations 15-26 on the first vehicle, and then perform one or more operations 15-26 on the second vehicle.

In another example, the segmented operations may be performed in a different order for the first and second vehicle, for example the system 100 may perform one or more of operations 1-14 on a first vehicle, and then perform one or more operations 15-26 on the second vehicle, and the perform one or more operations 15-26 on the first vehicle. The segmented operations may be ordered to minimize the total or overall processing time for both vehicles or one vehicle.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computer-implemented method comprising:
   determining one or more lifting points of a vehicle;
   positioning lifting sections of a vehicle lifting device to the determined one or more lifting points;
   instructing the vehicle lifting device to lift the vehicle to a height above a ground surface;
   positioning a tooling end of robotic apparatus to a position about a first wheel of the vehicle, the robotic apparatus including one or more sensors to obtain images;
   obtaining a plurality of images of the vehicle via the one or more sensors;
   based on the obtained plurality of images of the vehicle, determining whether the first wheel is out of alignment; and
   displaying, via a user interface, alignment values associated with the first wheel.

2. The method of claim 1, the determining whether the first wheel is out of alignment comprising:
   determining a plane of the first wheel of the vehicle; and
   identifying that the first wheel is off angle from a normal angle.

3. The method of claim 1, further comprising:
   recording that the first wheel needs alignment.

4. The method of claim 1, wherein the alignment values comprise an angle of the first wheel.

5. The method of claim 1, further comprising:
   based on the obtained plurality of images of the vehicle, determining whether the first wheel has any pre-existing damage.

6. The method of claim 1, further comprising:
   generating a vehicle service reporting including the plurality of images, the report indicating that corrective action should be performed on the vehicle.

7. The method of claim 1, further comprising:
   removing with the robotic apparatus, the first wheel from a first wheel hub of the vehicle;
   removing with the robotic apparatus, a second wheel from a second wheel hub of the vehicle;
   replacing with the robotic apparatus, the first wheel onto the second wheel hub of the vehicle; and
   replacing with the robotic apparatus, the second wheel onto the first wheel hub of the vehicle.

8. The method of claim 1, further comprising:
   based on the obtained plurality of images of the vehicle, determining a tread depth of a first tire affixed to the first wheel.

9. The method of claim 1, further comprising:
   removing with the robotic apparatus, the first wheel from a first wheel hub of the vehicle; and
   based on the obtained plurality of images determining whether a brake pad needs replacement.

10. A robotic system comprising:
    a computer system including one or more processors; and
    a robotic apparatus comprising a tooling end, one or more sensors to obtain images and control circuitry, the control circuitry of the robotic apparatus communicatively coupled to the computer system;
    wherein the computer system is configured to perform the operations, using the or more processors, of:
    determining one or more lifting points of a vehicle;
    positioning lifting sections of a vehicle lifting device to the determined one or more lifting points;
    instructing the vehicle lifting device to lift the vehicle to a height above a ground surface;
    positioning the tooling end of robotic apparatus to a position about a first wheel of the vehicle, the robotic apparatus including one or more sensors to obtain images;
    obtaining a plurality of images of the vehicle via the one or more sensors; and
    based on the obtained plurality of images of the vehicle, determining whether the first wheel is out of alignment; and
    displaying, via a user interface, alignment values associated with the first wheel.

11. The system of claim 10, the determining whether the first wheel is out of alignment comprising:
    determining a plane of the first wheel of the vehicle; and
    identifying that the first wheel is off angle from a normal angle.

12. The system of claim 10, further comprising:
    recording that the first wheel needs alignment.

13. The system of claim 10, wherein the alignment values comprise an angle of the first wheel.

14. The system of claim 10, the operations further comprising:
    based on the obtained plurality of images of the vehicle, determining whether the first wheel has any pre-existing damage.

15. The system of claim 10, the operations further comprising:
    generating a vehicle service reporting including the plurality of images, the report indicating that corrective action should be performed on the vehicle.

16. The system of claim 10, the operations further comprising:
    removing with the robotic apparatus, the first wheel from a first wheel hub of the vehicle;
    removing with the robotic apparatus, a second wheel from a second wheel hub of the vehicle;
    replacing with the robotic apparatus, the first wheel onto the second wheel hub of the vehicle; and
    replacing with the robotic apparatus, the second wheel onto the first wheel hub of the vehicle.

17. The system of claim 10, the operations further comprising:
    based on the obtained plurality of images of the vehicle, determining a tread depth of a first tire affixed to the first wheel.

18. The system of claim 10, the operations further comprising:
    removing with the robotic apparatus, the first wheel from a first wheel hub of the vehicle; and
    based on the obtained plurality of images determining whether a brake pad needs replacement.

19. A computer-implemented method comprising:
    positioning a tooling end of robotic apparatus to a position about a first wheel of a vehicle, the robotic apparatus including one or more sensors to obtain images;
    obtaining a plurality of images of the vehicle via the one or more sensors;
    based on the obtained plurality of images of the vehicle, determining whether the first wheel is out of alignment;
    displaying, via a user interface, alignment values associated with the first wheel; and
    generating a vehicle service report including the plurality of images, the report indicating that corrective action should be performed on the vehicle.

20. A robotic system comprising:

a computer system including one or more processors; and a robotic apparatus comprising a tooling end, one or more sensors to obtain images and control circuitry, the control circuitry of the robotic apparatus communicatively coupled to the computer system;

wherein the computer system is configured to perform the operations, using the or more processors, of:

positioning the tooling end of robotic apparatus to a position about a first wheel of a vehicle, the robotic apparatus including one or more sensors to obtain images;

obtaining a plurality of images of the vehicle via the one or more sensors;

based on the obtained plurality of images of the vehicle, determining whether the first wheel is out of alignment;

displaying, via a user interface, alignment values associated with the first wheel; and generating a vehicle service report including the plurality of images, the report indicating that corrective action should be performed on the vehicle.

\* \* \* \* \*